US012602209B1

(12) United States Patent
Gung et al.

(10) Patent No.: US 12,602,209 B1
(45) Date of Patent: Apr. 14, 2026

(54) CONSTRAINED GENERATIVE FRAMEWORK APPLICATION DEVELOPMENT ENVIRONMENT

(71) Applicant: Amazon Technologies, Inc., Reno, NV (US)

(72) Inventors: James Gung, New York, NY (US); Arshit Gupta, Sunnyvale, CA (US); John Baker, Bellevue, WA (US); Yi Zhang, Sammamish, WA (US); Saab Mansour, San Jose, CA (US); Santosh Kumar Ameti, Bellevue, WA (US); Ruhaab Markas, The Colony, TX (US); Ganesh Kumar Gella, Redmond, WA (US); Katrin Kirchhoff, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 223 days.

(21) Appl. No.: 18/478,034

(22) Filed: Sep. 29, 2023

(51) Int. Cl.
      *G06F 8/38*              (2018.01)
(52) U.S. Cl.
      CPC ..................................... *G06F 8/38* (2013.01)
(58) Field of Classification Search
      CPC ...................................................... G06F 8/36
      USPC ............................... 717/105–121; 706/25–45
      See application file for complete search history.

(56) References Cited

U.S. PATENT DOCUMENTS

| | | | | |
|---|---|---|---|---|
| 7,421,393 B1 * | 9/2008 | Di Fabbrizio | .......... | G10L 15/28 |
| | | | | 379/88.04 |
| 7,451,403 B1 * | 11/2008 | Srinivasan | ................ | G06F 8/10 |
| | | | | 715/765 |
| 7,490,031 B1 * | 2/2009 | Qiu | ........................... | G06F 8/38 |
| | | | | 703/22 |
| 8,614,431 B2 * | 12/2013 | Huppi | ................. | H04W 52/027 |
| | | | | 250/559.36 |
| 8,660,972 B1 * | 2/2014 | Heidenreich | ............ | G06N 5/00 |
| | | | | 706/45 |
| 9,280,325 B2 * | 3/2016 | Breedvelt-Schouten | ................... | |
| | | | | G06F 3/04842 |
| 10,235,358 B2 * | 3/2019 | Tur | ........................ | G06F 40/30 |
| 10,789,041 B2 * | 9/2020 | Kim | ........................ | G06F 3/165 |
| 11,252,149 B1 * | 2/2022 | Bang | ....................... | G06F 3/167 |
| 11,281,355 B1 * | 3/2022 | Campos | .............. | G06F 3/04817 |
| 12,400,652 B1 * | 8/2025 | Fan | ....................... | G10L 15/183 |

OTHER PUBLICATIONS

Fischer et al, "Meta-Design: Design for Designers", ACM, pp. 1-10 (Year: 2000).*

(Continued)

*Primary Examiner* — Anil Khatri
(74) *Attorney, Agent, or Firm* — Hogan Lovells US LLP

(57) ABSTRACT

Systems and methods provide for modular, iterative framework to resolve inputs provided to an interaction environment. The input may be decomposed into different component parts and then relevant actions for each of the component parts may be predicted. An action may be selected and relevant parameters may be populated based on the input. If parameters remain unresolved, additional queries may be presented in order to resolve the remaining parameters. Multiple actions may be executed and then prepared to generate a combined response responsive to the input. Actions for a given interaction environment may be domain-specific and also may be developer-defined for a given goal or task to restrict one or more underlying language systems.

20 Claims, 15 Drawing Sheets

(56)  References Cited

OTHER PUBLICATIONS

Correa et al, "End-User Highlighted: featuring tailorable systems development", ACM, pp. 1-9 (Year: 2021).*

Hu et al, "Unlocking the Potential of User Feedback: Leveraging Large Language Model as User Simulator to Enhance Dialogue System", ACM, pp. 1-5 (Year: 2023).*

Shukhman et al, "Application of Large Language Models for Intent Mining in Goal-oriented Dialogue Systems", IEEE, pp. 4 (Year: 2024).*

* cited by examiner

500

Receive an input to an interaction environment
502

Determine one or more sub-components of the input
504

Determine, from a set of defined actions, one or more actions associated with the one or more sub-components
506

Select an action for a selected sub-component
508

Determine, from the input, one or more values corresponding to one or more parameters of the action
510

512
Additional parameters?

No    Yes

518
Additional actions?

Yes    No

514
Fill using input?

No    Yes

Generate a response to the input
520

516    Generate a prompt corresponding to the one or parameters for the action

FIG. 5

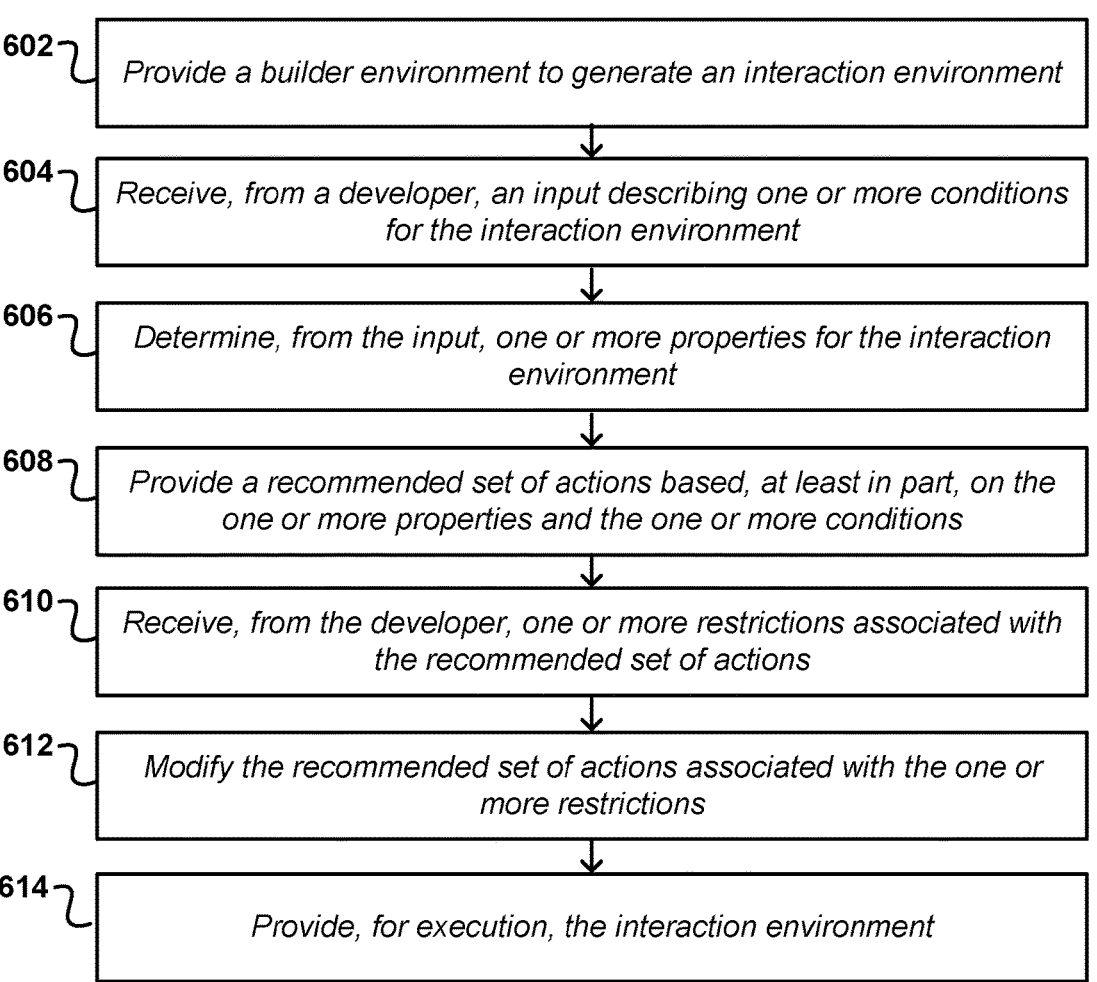

602 — Provide a builder environment to generate an interaction environment

604 — Receive, from a developer, an input describing one or more conditions for the interaction environment 606 — Determine, from the input, one or more properties for the interaction environment 608 — Provide a recommended set of actions based, at least in part, on the one or more properties and the one or more conditions 610 — Receive, from the developer, one or more restrictions associated with the recommended set of actions 612 — Modify the recommended set of actions associated with the one or more restrictions 614 — Provide, for execution, the interaction environment

FIG. 6

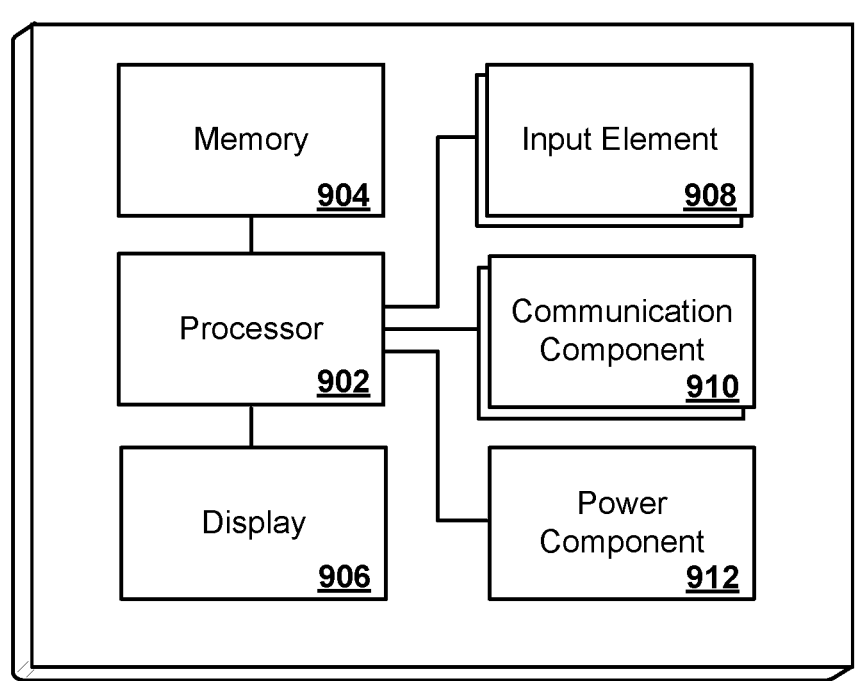
FIG. 9

CONSTRAINED GENERATIVE FRAMEWORK APPLICATION DEVELOPMENT ENVIRONMENT

BACKGROUND

When developing new interaction environments developers may be faced with a set of restrictions regarding the scope and content of information that may be provided by the interaction environments. As a result, as new generative tools are developed to simplify and enhance these environments, developers may not be able to adopt the generative tools due to problems related to hallucinations, unfaithful responses, and data leakage. Typical development environments may allow developers to import or otherwise link to different third-party applications, but cannot moderate the output content of the third-party applications without significant expenditures of time and resources. To overcome these problems, developers either need to abandon use of these generative tools or painstakingly generate specific prompts for a variety of use cases in order to reduce a likelihood of undesirable outcomes.

BRIEF DESCRIPTION OF THE DRAWINGS

Various embodiments in accordance with the present disclosure will be described with reference to the drawings, in which:

FIG. 5 illustrates an example process for generating a response to an input query using a task-based dialogue system that can be utilized in accordance with various embodiments.

FIG. 6 illustrates an example process for providing a builder environment to generate interaction environments that can be utilized in accordance with various embodiments.

FIG. 9 illustrates components of an example computing device that can be used to perform aspects of the various embodiments.

DETAILED DESCRIPTION

Figure 1:
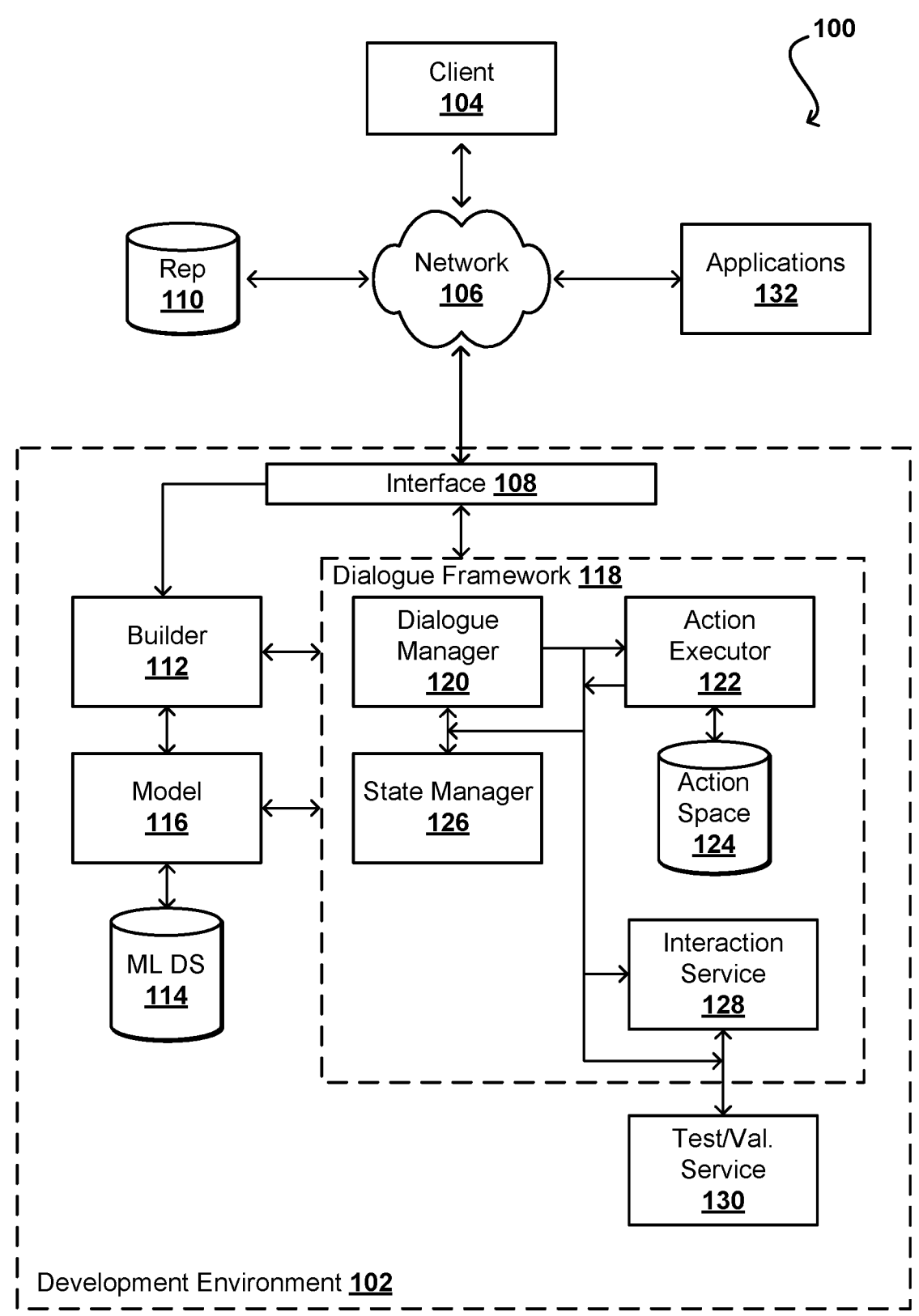
FIG. 1 illustrates an example system for providing a development environment in accordance with various embodiments.

Embodiments of the present disclosure are directed toward a framework for task-oriented dialogue systems. Systems and methods may include a modular, iterative, generative, end-to-end trainable framework that permits a developer to control or otherwise restrict an output associated with an underlying dialogue system, such as a large language model (LLM). For example, a dialogue management model may be used to determine various inputs provided to the dialogue system, interpret and predict follow on actions for execution from a developer-defined set of actions, execute the various actions to populate variables to generate a response, and maintain context of the conversation to generate a reply to the initial input. As a result, underlying dialogue systems may be constrained to a particular set of actions, thereby preventing the dialogue system from generating and providing unpredictable and/or untrustworthy outputs, or otherwise providing unintended results. Furthermore, various embodiments may permit an iterative conversation between the user and the dialogue system to elicit additional information that may be used to execute various actions prior to providing a response to the initial input.

Various embodiments overcome problems associated with using dialogue systems, such as LLMs, with enterprise interactive environments (e.g., chatbots, virtual assistants, etc.). While LLMs and other dialogue systems can produce rich responses to user inputs, their output results are often unpredictable. For example, models can go beyond their intended scope, provide inaccurate or untrue information, and/or potentially leak training data information. Because of these drawbacks, certain industries and/or developers may be reluctant to use the otherwise powerful benefits of various dialogue systems and models. Various embodiments address these problems, and others, by increasing controllability over the various dialogue systems while maintaining the ability to interact with these systems in a natural way. For example, systems and methods may limit an action space of the different dialogue systems and/or with an interaction environment that incorporates the dialogue systems to operate over a defined set of developer-defined actions (e.g., application programming interfaces (APIs)). The developer-defined actions may be limited in scope and/or particularized for a given function of the interaction environment, such as to stage calls (e.g., Add( . . . )), update parameters (e.g., Update( . . . )), cancel or stop actions (e.g., Delete( . . . ), Stop( . . . )), request additional information (e.g., Resolve ( . . . ), Clarify( . . . )), and/or present information responsive to an input (e.g., (Say( . . . ), Reply( . . . )), among various other potential actions. As a result, various dialogue systems may be used in a modular, iterative manner to make predictions for which of the developer-defined actions should be used for a given dialogue state. Accordingly, developers can control how each action is implemented based on their business needs and/or goals of the interaction environment while also controlling content generated by the dialogue systems.

Systems and methods of the present disclosure may present a framework that incorporates various dialogue systems into an interaction environment that can be controlled by one or more developers. Various embodiments may incorporate one or more dialogue systems, which may include different LLMs and other supporting systems, while providing a development environment in which the developer may focus on the user experience and content of the interaction environment. Embodiments may further integrate tools into the development environment to provide one or more API endpoints to handle common or otherwise expected interactions, such as disambiguation handling, supporting negations, greetings, and the like. Moreover, one or more systems may also leverage the contextual tracking of the various dialogue systems to maintain contextual awareness throughout the conversation. The framework may also integrate controls that developers can use to control a behavior and/or response from their interaction environments, for example, by injecting their particular business logic into the framework, such as a certain style of response and/or particular preferences for handling errors, among other options. Furthermore, the development embodiment may provide for testing and validation of different interaction environments in order to iteratively improve the interaction environments in a data-driven way, such as by interacting with the framework and/or using live data traffic to review, revise, and improve interactions. Systems and methods may be integrated into a common end to end model that includes various components and/or sub-components, which may include additional models, and/or may be standalone systems that call or otherwise interact with one another.

FIG. 1 illustrates an example environment 100 for creating, testing, and deploying one or more interaction environments, in accordance with various embodiments of the present disclosure. In this example, a development environment 102 is used to provide access to one or more resources that a client 104 (e.g., a client device, a user, a developer, etc.) may access via one or more networks 106 to create customizable interaction environments, such as deployable and/or accessible environments including chatbots, artificial intelligence (AI) systems, virtual assistants, and/or and the like, for deployment in one or more remote or networked systems. The development environment 102 may execute on one or more underlying resources, such as compute resources, storage resources, and/or the like, when queried by the client 104. It should be appreciated that various other components may also be included, or hosted separately in a different environment, and are not shown for clarity with the following discussion. Furthermore, these components are shown by way of example and are not intended to limit the scope of the present disclosure. The resources can include physical and virtual resources that may be located at one or more locations controlled by the provider or a third-party or may be located at a location controlled by the client, or an entity with which the client is associated. Moreover, various resources may be illustrated as separate blocks or components, but different embodiments may group or otherwise share functionality between different blocks or components In this example, the client 104 may request access to the development environment 102 in order to create one or more interaction environments, for example with a builder tool or other interactive environment in which the client 104 can provide commands to implement certain functionality within an environment. For example, the development environment 102 may host a builder or may provide access as part of a service for hosting or otherwise providing a service to one or more products from the client 104, such as a website or an application. In at least one embodiment, the client 104 may use one or more client devices to access the resources of the development environment 102 over the one or more networks 106. The client 104 and/or the client device may be referred to interchangeably in that the client device facilitates the interaction with the development environment 102. Moreover, the client device may execute one or more actions or tasks according to one or more rules or instructions stored on different memories such that physical interaction or explicit instructions from the client 104 are not used.

The client device can include any appropriate electronic device operable to send and receive requests, messages, or other such information over an appropriate network and convey information back to a user of the device and/or convey information that can be confirmed or otherwise analyzed by software executing on the device. Examples of such client devices include personal computers, tablet computers, smart phones, notebook computers, various edge devices, and the like. The network(s) 106 can include any appropriate network, including an intranet, the Internet, a cellular network, a local area network (LAN), or any other such network or combination, and communication over the network can be enabled via wired and/or wireless connections. The development environment 102 can include any appropriate components for receiving requests and returning information or performing actions in response to those requests. As an example, the provider environment might include Web servers and/or application servers for receiving and processing requests, then returning data, access to resources, Web pages, video, audio, or other such content or information in response to the request.

The development environment 102 may be a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to client commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network may implement various computing resources or services, which may include a virtual compute service (referred to in various implementations as an elastic compute service, a virtual machines service, a computing cloud service, a compute engine, or a cloud compute service), data processing service(s) (e.g., map reduce, data flow, and/or other large scale data processing techniques), data storage services (e.g., object storage services, block-based storage services (referred to in various implementations as cloud disks service, a managed disk service, a storage area network service, a persistent disk service, or a block volumes service), or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In various embodiments, the development environment 102 may include various types of electronic resources that can be utilized by multiple users for a variety of different purposes. In at least some embodiments, all or a portion of a given resource or set of resources might be allocated to a particular user or allocated for a particular task, for at least a determined period of time. This can include, for example, enabling a customer to launch one or more instances of one or more types of these resources. In at least one embodiment, a resource instance can include storage volumes, compute instances, and network interfaces, among other such options. This can include, for example, enabling a customer to launch one or more instances of one or more types of these resources. The sharing of these multi-tenant resources from a provider environment is often referred to as resource sharing, Web services, or "cloud computing," among other such terms and depending upon the specific environment and/or implementation.

In one embodiment, the development environment 102 can correspond to a service provider that, in addition to providing access to the resources, may also provide additional monitoring and management services, which can use resource capacity from one or more storage solutions, among other options, to provision resources and/or execute various tasks associated with a user account. In this example, a request to the development environment 102 can be received by an interface layer 108 of the environment. As known for network environments, the interface layer can include components such as interfaces (e.g., APIs), load balancers, request and/or data routers, and the like.

In various embodiments, the request may include a command or an input, which may be accompanied by additional data, such as data files or links that provide access to one or more templates or stored representations within a representation datastore 110. The client 104 may directly provide certain templates or representations or may link to the datastore 110 so that different APIs and the like may be added to different interaction environments and then called responsive to one or more inputs or commands. Further, in various embodiments, the datastore 110 or portions thereof may also be stored within the development environment 102, for example as part of a set of storage resources that are associated with one or more authorized users of the development environment 102.

During operation, the client 104 may submit multiple requests to the development environment 102 in order to generate and/or create one or more interaction environments. The requests may be commands to add certain features to a given interaction environment, to adjust settings for the interaction environment, to test different features, and/or the like. In this example, a builder 112 receives the requests from the client 104 and may then implement the requests into different aspects of the interaction environment. For example, one of the requests may be to use one or more dialogue systems and/or models from a machine learning datastore 114. A selected model 116 may be an LLM that is used within the interaction environment to provide a conversational exchange between a user of the interaction environment and the LLM, which may be a pre-trained LLM that includes features such as context recognition and the like. As noted herein, LLMs often suffer from problems associated with generating responses that may exceed a desired domain and/or hallucinating unreliable information. These problems can often be traced back to the unrestricted nature in which the LLMs are deployed and/or due to unclear prompts provided to the LLM. Systems and methods of the present embodiments address and overcome these problems by instituting a dialogue framework 118 within the development environment 102 that may be used to interact with the selected model 116 (and other features included within the interaction environment) in order to control or otherwise regulate different permitted actions for the model 116.

In this example, the dialogue framework 118 may be used by developers as an intermediary between the model 116 and a user interacting with a given interaction environment to define a set of discrete actions for the model 116 based on the goals of the interaction environment and/or based on the domain selected for the interaction environment. In at least one embodiment, a dialogue manager 120 is used to fine-tune the model 116 to decompose requests and iteratively prepare/refine responses at each step, thereby predicting a modularized action to seek clarifications, retrieve missing information, update intermediate results, generate and refine contextualized responses, and/or instantiate and execute APIs. The dialogue manager 120 may implement one or more dialogue policies based on the input provided to the interaction environment and may also be pre-fine-tuned on various dialog tasks in a multi-task learning fashion (e.g., pre-training for plug-and-play task-oriented dialog systems). In operation, the dialogue manager 120 may determine a next action based on a dialogue state, which may be based on one or more dialogue policies. Furthermore, systems and methods may also include additional tasks within the dialogue manager 120, such as decomposing inputs to different sub-components and then predicting an appropriate API for resolving variables associated with the sub-components. In various embodiments, the dialogue manager 120 may be used to implement one or more actions or meta-actions that operate over additional API calls or other actions executed within the environment. By way of example, different meta-actions may be parameterized over an action space in order to clarify or otherwise guide different actions for a specific function.

An action executor 122 may be a rule-based operator that executes one or more actions as instructed by the dialogue manager 120. For example, the actions may include querying a database, updating the working memory, making calls to one or more APIs, etc. During operation, the dialogue manager 120 and the action executor 122 may operate in an iterative manner (at least some of the time) until a system reply is emitted, such as by filling in an unknown variable for a selected action, eliciting a response from the user, and/or the like. In at least one embodiment, the action executor 122 may query an action space 124 to determine which actions may be implemented for a given prediction made by the dialogue manager 120. The query to the action space may be controlled by the meta-actions supplied from the dialogue manager 120. For example, an input may be evaluated by the dialogue manager and then a prediction may be generated for further actions, such as predicting that a portion of the input should be "clarified" or to "add" an API call to a working memory. The action space 124 may include a developer-defined set of actions that may restrict or otherwise limit how interactions may be formed between the user and the model 116. For example, the action space 124 may have a pre-defined set of potential responses to an initial input, and if the pre-defined set of responses cannot be used to resolve the initial input, an error or other message may be provided to the user informing the user of the limitations of the system. Moreover, as noted herein, the specific actions defined within the action space 124 may be particularly selected to perform certain tasks to populate variables or resolve queries in line with a goal of the interaction environment. That is, the action space 124 may be tuned by the developer for a given task or for a selected domain, thereby enabling the development environment 102 to particularize which actions may be implemented for a given interaction environment. As noted here, various embodiments of the present disclosure may include one or more pre-defined action spaces 124 for a set domain that the client 104, when creating an interaction environment, may further refine and tune for their selected purposes.

Embodiments of the present disclosure also include a state manager 126, which may also be referred to as a working memory, to track the dialog state and capture salient information extracted from different portions of the conversation between the user and the model 116. The dialogue manger 120 and/or the action executor 122 may use information collected and stored by the state manager to generate prompts or the like, which may follow a rule-based approach. In at least one embodiment, to address context limits, systems and methods may also incorporate actions that retrieve relevant facts from "long term memory," external to the information stored by the state manager 126, such as bot-specific APIs, documents, and conversational examples.

As the user interacts with the interaction environment and the dialogue manager 120 identifies different actions for the action executor 122 intermediate responses may be generated and stored in the working memory associated with the state manager 126, and an interaction service 128 may be used to output the replies from the state manager 126, for example responsive to an instruction from the dialogue manager 120 that sufficient information has been gathered to generate the response. The interaction service 128 may be used to format or otherwise present the information in a business-specific manner, which may be tuned by the developer. For example, an organization may have a particular style or theme for responses and the interaction service 128 may format outputs from the model 116 into the desired format.

A testing and validation service 130 is also provided to iteratively evaluate and test responses, intermediate responses, information collection, and/or the like. For example, the testing and validation service 130 may enable a developer to visualize the different actions being recommended by the dialogue manager 120 and then determine the ordering or approach taken to prompt the user to provide more information. The testing and validation service 130 may also be used to evaluate real-time and/or live information from users and provide suggestions or feedback to the developer for changes, such as by noting where users may become frustrated (based on their replies) or identifying certain prompts that lead to failures. The dialogue framework 118 may then be incorporated into one or more interaction environments that are deployed along with one or more applications 132 associated with the developer.

At runtime, a user associated with a built and deployed interaction environment, which may include the dialogue framework 118, may provide an input to the interaction environment, such as a textual input, an auditory input, a graphical input, an image or video input, and/or combinations thereof. Upon receipt of the input, the dialogue framework 118 may enable the interaction environment to identify a response associated with the input and then to trigger one or more developer-defined actions to acquire sufficient information to generate the response. For example, in at least one embodiment, a user provides an utterance to the interaction environment, which may be a chatbot (e.g., an agent) or some other AI system. The dialogue manager 120, as noted herein, may be used to decompose the utterance to different sub-components (e.g., by leveraging features of the model 116 and/or one or more API calls) and then, for each sub-component, predicts an action (e.g., an API associated with an action) defined by the developer to populate or otherwise address the sub-components. If the appropriate action/API is available (e.g., has been defined by the developer) then a goal and/or intent associated with the particular API may be moved to the working memory and evaluated to determine whether one or more parameters of the API have been resolved. For example, for a given goal and/or intent a specific API may have a number of parameters and associated values and/or variables to fill those parameters in order to execute the action associated with the API. If the parameters are all filled, then the action may be executed. If not, then additional actions may be called in order to obtain information to fill the parameters. Various system and methods may iteratively address inputs or prompts provided by the user via the decomposition of the input. For example, a user input of "I want to fly to Seattle as well as book a hotel there" would be decomposed into "I want to fly to Seattle" and "book a hotel there [Seattle]," which may lead to identification of different actions (e.g., an API to book flights and an API to book hotel rooms) that can then acquire additional information for various parameters in order to execute the request.

Figure 2:
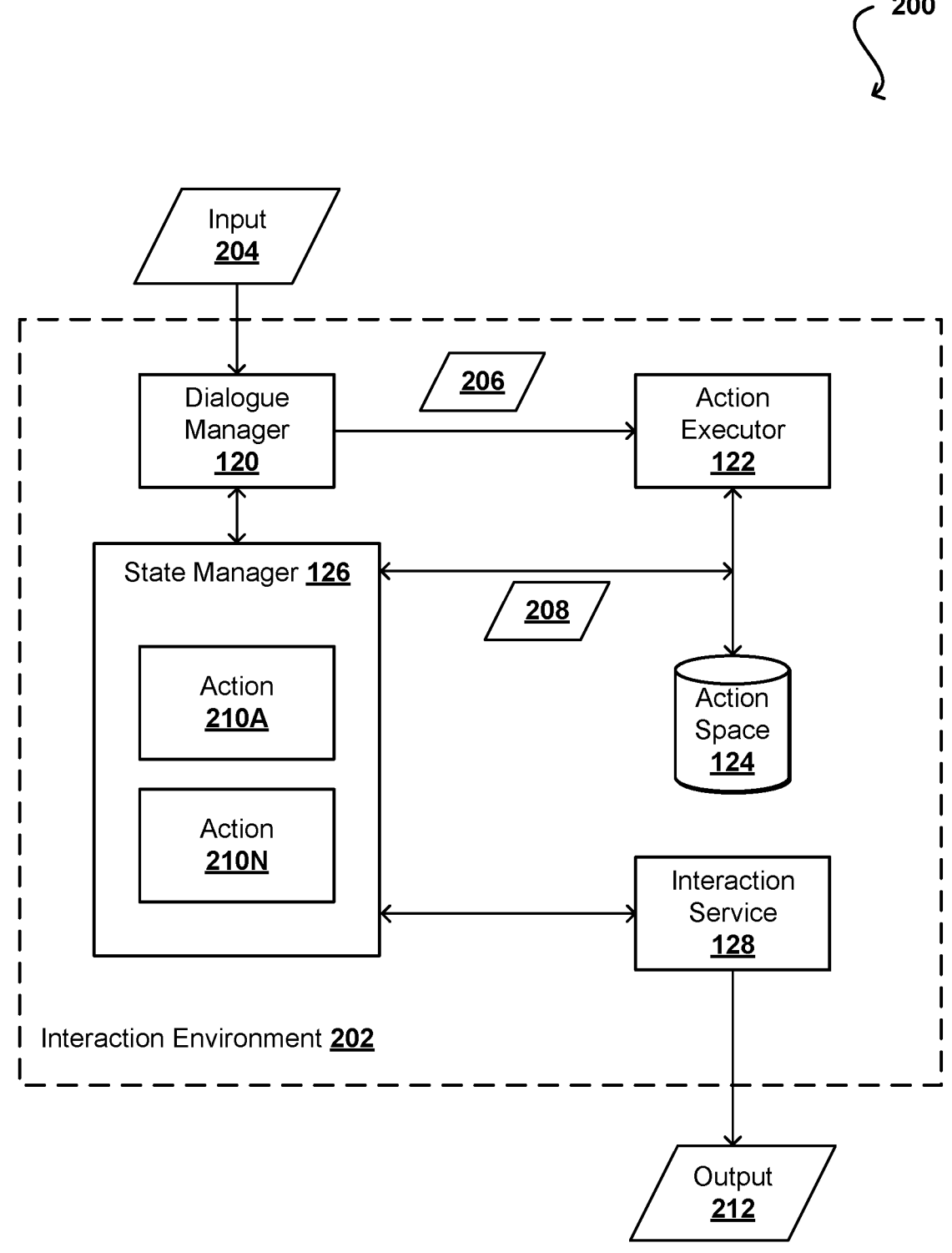
FIG. 2 illustrates an example environment for a framework to control a task-based dialogue system in accordance with various embodiments.

FIG. 2 illustrates an example environment 200 that may be used with embodiments of the present disclosure in which the framework is executing within an interaction environment 202 that has been built and deployed and may include one or more underlying models and/or rules to control various actions. The interaction environment may further include one or more underlying dialog systems, such as an LLM, which is not illustrated for clarity with the present discussion. In this example, an input 204 is provided to the interaction environment. The input 204 may include one or more utterances or textual inputs, among other options. As an example for an interaction environment associated with a bot to help a user book a flight, the input 204 may be a textual request or prompt such as "I want to fly to Seattle next month with AAA Airlines." The dialogue manager 120 may receive the input 204 and proceed with evaluating and dividing the input 204 into different sub-components. In at least one embodiment, one or more APIs may be used to execute the dividing function. The dialogue manager 120 may predict or otherwise determine that this function is necessary and then may transmit a command 206 to the action executor 122 to determine whether an appropriate developer-defined action is available to execute an action associated with the command. For example, the action executor 122 may process the command 206 and then query the action space 124 to identify one or more appropriate functions to execute the action, such as a developer-determined API. As noted herein, the API may be provided by the developer and/or may be provided by the provider associated the development environment, among various other options. In at least one embodiment, different sets of APIs may be stored and accessible for a given interaction environment 202. That is, the action space 124 may include different subsets of various APIs that are accessible based on which interaction environment 202 is requesting access. Furthermore, as noted herein, various features of one or more of the dialogue manager 120 and/or the action executor 122 may follow a rules-based approach to processing different inputs 204 and/or may be incorporated into a trained model that processes inputs 204 based on contextual information.

In at least one embodiment, the action executor 122 may retrieve the various APIs and/or functions that can execute the predicted actions associated with the command 206 and may transmit execution information 208 to the state manager 126, which as noted herein, may include a working memory. The working memory may stage or otherwise query in-progress API calls that may include one or more blanks or variables to be populated in order to fully execute the calls. For example, a first API may require three different parameters. If the initial input 204 does not include each of the three parameters, various embodiments of the present disclosure may be used to determine which parameters are missing, identify an appropriate action from the action space 124 that will enable the parameter to be identified, and then populate a variable based on a follow up input from the user for the parameter to execute the API call.

In this example, different actions 210A-210N are staged in the state manager 126 responsive to the transmission of the execution information 208. It should be appreciated that the execution information 208 may include different API calls, information extracted from the input 204, instructions, and/or the like. The state manager 126 may also be accessible to the dialogue manager 120, as shown, to enable identification of different parameters or variables which can be used for the dialogue manager 120 to predict and submit additional commands 206 to the action executor 122 to pull one or more additional actions (e.g., APIs) from the action space 124 in order to generate a response to the input 204.

Various embodiments may be used to provide a responsive output to the user in a variety of different ways. An interaction service 128 may be used to identify an appropriate response modality and generate one or more outputs 212. For example, if the interaction environment 202 were associated with a chatbot and the user was providing inputs 204 that were textual, the appropriate output modality may be text and/or audio. However, in various other embodiments, the appropriate output modality may include images or videos, or combinations of different outputs. For example, if the input 204 was a request to provide directions to a location, the output 212 may include a combination of modalities such as turn-by-turn instructions in text and/or audio and also images of a map and/or key locations along the instructions. In various embodiments, the output 212 may also be queries to obtain additional information, such as more inputs 204, in order to populate the different parameters associated with the actions 210A-210N. In this manner, the interaction environment 202 may be used to process the input 204, decompose the input 204 into different sub-components, identify relevant actions to generate a responsive query, iteratively transmit responses and/or replies to the input 204, and provide the responsive output 212 to the input 204.

FIGS. 3A-3L illustrate example environments 300 that may be used with embodiments of the present disclosure. Systems and methods may be directed toward one or more frameworks that may be used along with an interaction environment, such as a chatbot or virtual AI, in which a user may provide one or more inputs 204 to the interaction environment for processing and evaluation. Various embodiment may further include an underlying dialogue system, such as an LLM, that may be controlled or otherwise restricted by one or more developer-defined actions that are particularized for a given interaction environment. Restrictions may be provided through a rule-based approach to input evaluation and response and/or incorporated into one or more models. In this manner, a modular system may be generated that iteratively receives and prompts a user to provide sufficient information to execute one or more requested tasks while also reducing a likelihood of the LLM generating false or misleading information, among various other benefits. The illustrated interaction environment may be directed toward a task-oriented dialogue system powered by an underlying model that is controlled by the developer to augment generated outputs through a set of predefined prompts and/or exposing specific actions/arguments.

In this example, the input 204 is provided to the interaction environment and represented within a dialogue history 302. The dialogue history 302 may keep a running log or history of interactions between the user and the interaction environment and may be used to extract salient information and/or to determine one or more actions for responding to different prompts or queries. The dialogue manager 120 may process and decompose the input 204 to predict a modularized action to respond to the input 204. In at least one embodiment, the decomposition is performed by the dialogue manager 120, but it should be appreciated that the dialogue manager 120 may also send one or more commands 206 to the action executor 122 to set up calls to one or more APIs to perform the decomposition and identification of sub-components associated with the input 204. In this example, the command 206 may be to the action executor 122 to execute one or more internal actions implemented using one or more models to identify potentially relevant APIs. For example, as noted herein, one or more pre-defined meta-actions may be used to direct the action execution 122, such as "Identify( . . . )" in which an input is provided and then one or more policy models determines appropriate inputs for the meta-action to determine how to handle the input 204. One such action may be to identify relevant APIs or other functions within the action space 124. After identifying relevant APIs, the working memory (e.g., the state manager 126) may be updated to generate context-specific inputs for the policy model to identify specific actions for resolving the input 204.

Figure 3A:
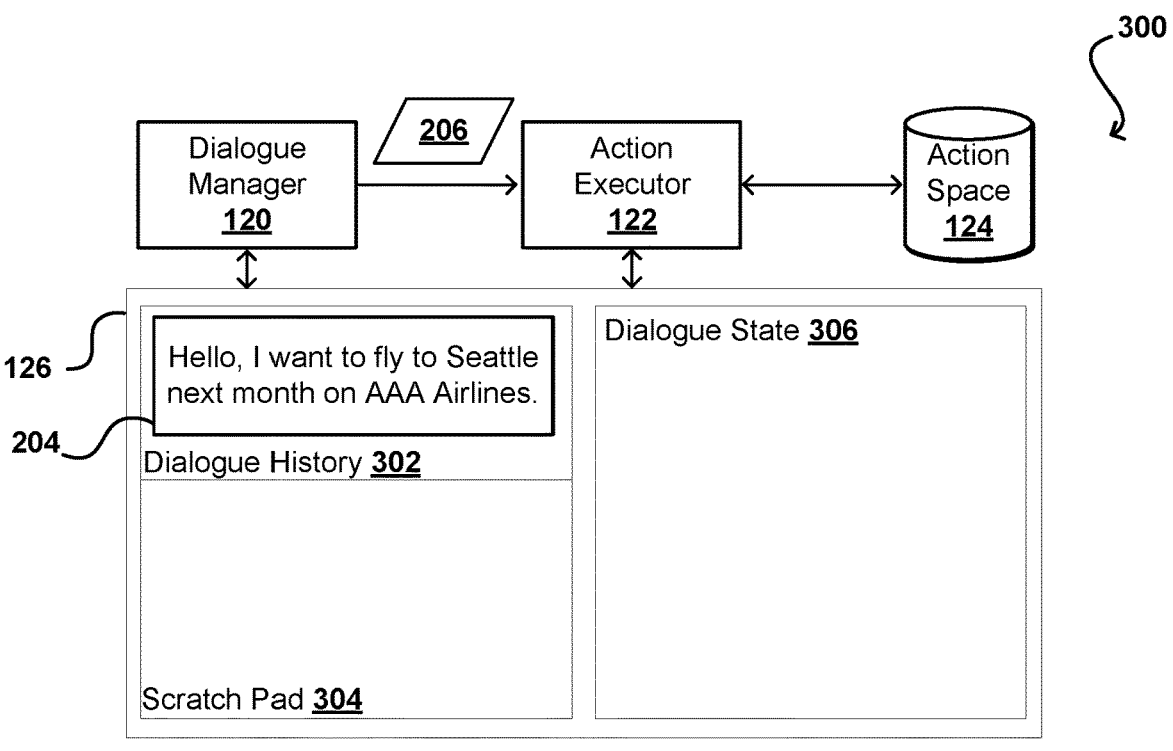
FIGS. 3A-3L illustrate example representations of a development environment in accordance with various embodiments.
Figure 3B:
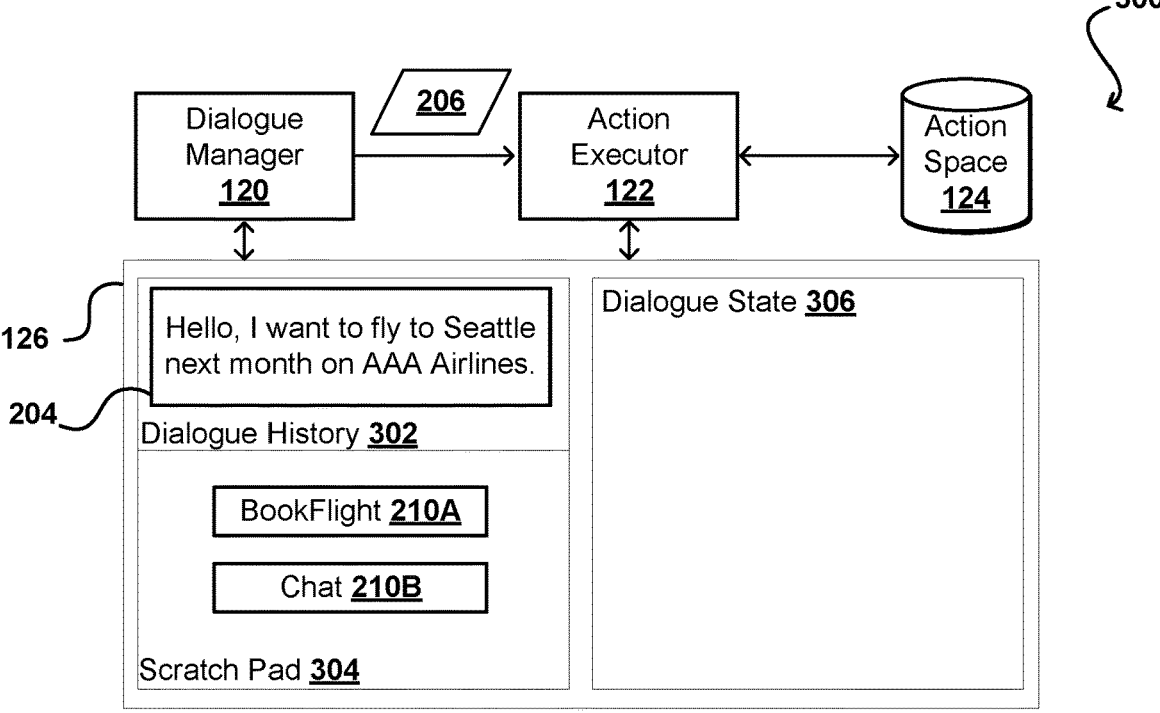

FIG. 3B illustrates a next step in the process after the action executor 122 has processed the "Identify( . . . )" meta-action using the input 204. In this example, a pair of different actions 210A, 210B (e.g., APIs) have been identified as being relevant to providing a response to the input 204. These actions 210A, 210B are shown populated within a scratch pad 304, which is shown by way of example as an abstraction of an area in which relevant information is consolidated. It should be appreciated that such a representation is provided for ease of explanation. For the input 204, the actions 210A, 210B correspond to a BookFlight action 210A and a Chat action 210B. The BookFlight action 210A may be a developer-defined API that includes one or more parameters to enable booking of flights. For example, the BookFlight action 210A may handle searching and booking upon receiving sufficient information for a destination city, number of passengers, airline, departure date, return date, and flight class. In at least one embodiment, certain context of the input 204 may be used to identify the BookFlight action 210, such as an input 204 that includes "flight" or "travel" or "one-way" or some other keywords that provide context for the desired outcome from the input 204. The Chat action 210B may also include various parameters and may also be a developer-defined API that permits pleasantries and other communications between the user and the interaction environment.

Figure 3C:
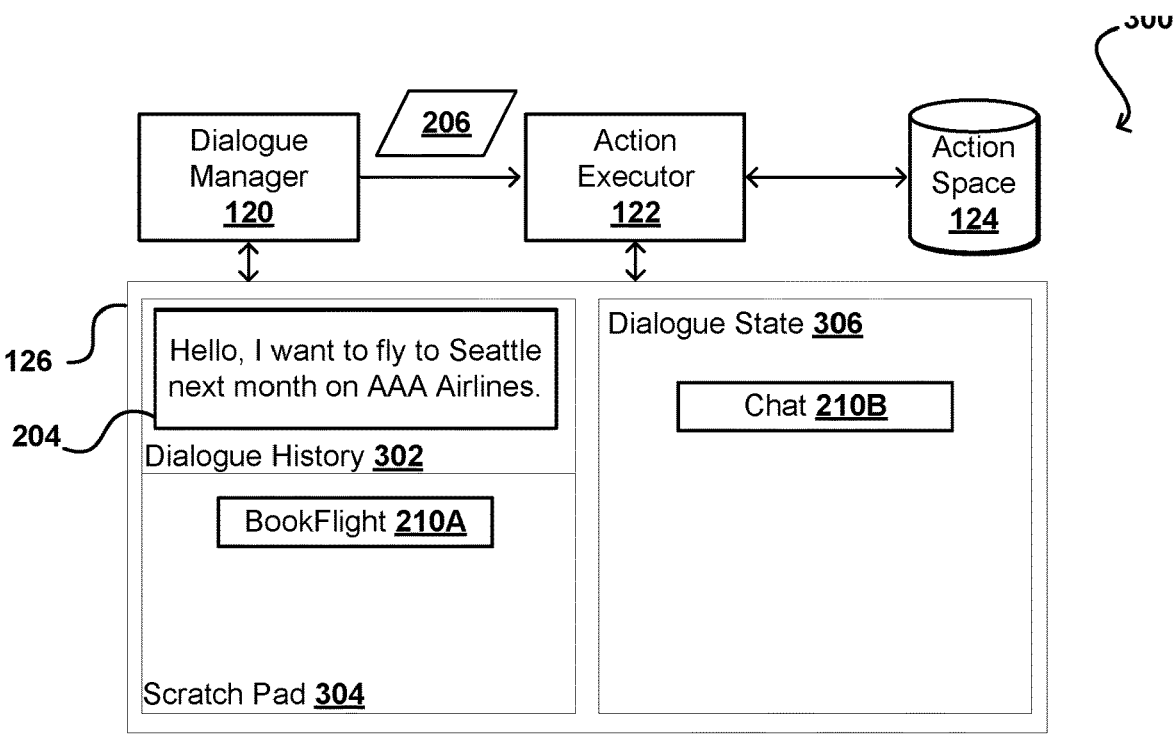

FIG. 3C illustrates a further step in which the dialogue manager 120 determines an appropriate response by providing the command 206 to the action executor 122 to execute the Chat action 210B. For example, the dialogue manager 120 may send the command 206, such as Add (Chat), to move the Chat action 210B into a dialogue state 306, which may function as a staging area for in-progress calls. For example, the Add( . . . ) command, much like the Identify ( . . . ) command noted herein, from the dialogue manager 120 may instantiate a new API call and add that new call to the dialogue state 306. In at least one embodiment, systems and methods may use a two-step approach to populating the dialogue state 306 to ensure that the dialogue policy model has all of the relevant context for predicting whether an API call is appropriate or not. That is, in this example, first the Identify action was used and then, upon evaluating the potentially relevant actions, the Add action was used to instruct the action executor 122 to use a particular API.

Figure 3D:
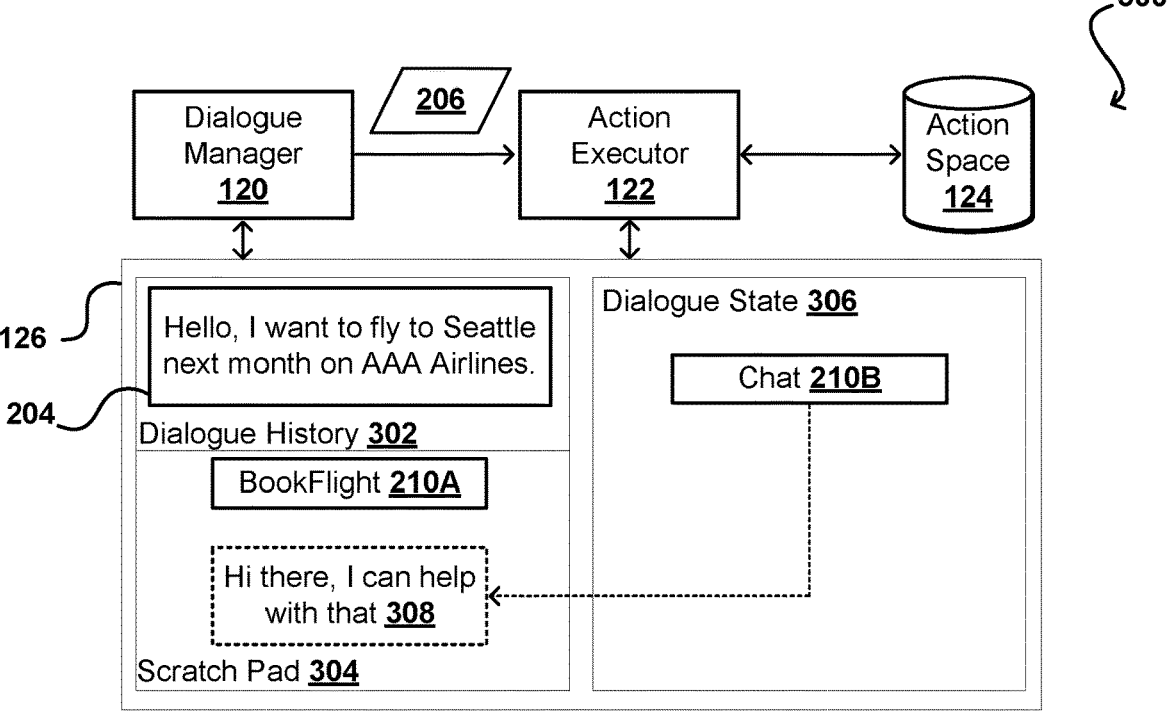

FIG. 3D illustrates a partial response 308 shown within the scratch pad 304 using the Chat action 210B. In this example, the partial response 308 includes a reply to the "Hello" portion of the input 204. As shown, the Chat action 210B may be considered a parameter-less action in which additional information is not required other than the initial input (e.g., "Hello") and the model may be generated to provide a follow up greeting or pleasantry based on the context of the input 204. The partial response 308 may then be stored and/or maintained in the scratch pad 304 prior to generating a full response to the input 204. However, it should be appreciated that various embodiments may generate responses for particular actions once the action is complete. For example, because the Chat action 210B is parameter-less, the partial response 308 may be considered a complete response and/or provide an indication that the API call is complete, and therefore, a full response may be generated for the user. In certain embodiments, it may be desirable to present all of the information to the user at the same time. In other embodiments, it may be desirable to logically group responses. Accordingly, a time when partial responses are presented as full responses may be tuned and/or particularly selected based on developer preferences.

Figure 3E:
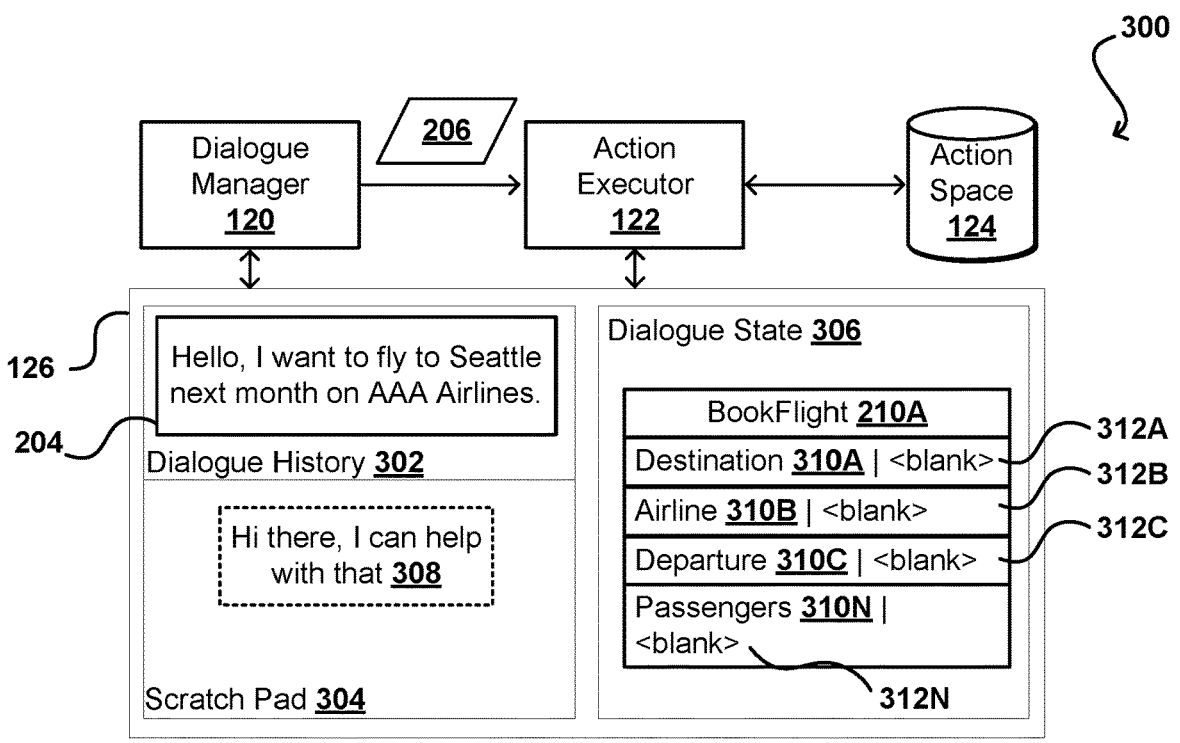

FIG. 3E continues the process of addressing the input 204 by issuing the command 206 to Add( . . . ) the BookFlight action 210 to the dialogue state 306. As shown, the BookFlight 210A action is now removed from the scratch pad 304 because it is now an in-progress application. Furthermore, because the Chat action 210B has completed, it has also been removed from the dialogue state 306. Accordingly, the sequence of events illustrates how two API calls can be iteratively staged from a single input 204.

In this example, the BookFlight action 210A includes a number of parameters 310A-310N with associated values 312A-312N. At the time of staging, the values 312A-312N are all blank because the API has not yet been executed to try and resolve the blanks based on the input 204 and/or additional follow up inquiries, as will be described herein.

Figure 3F:
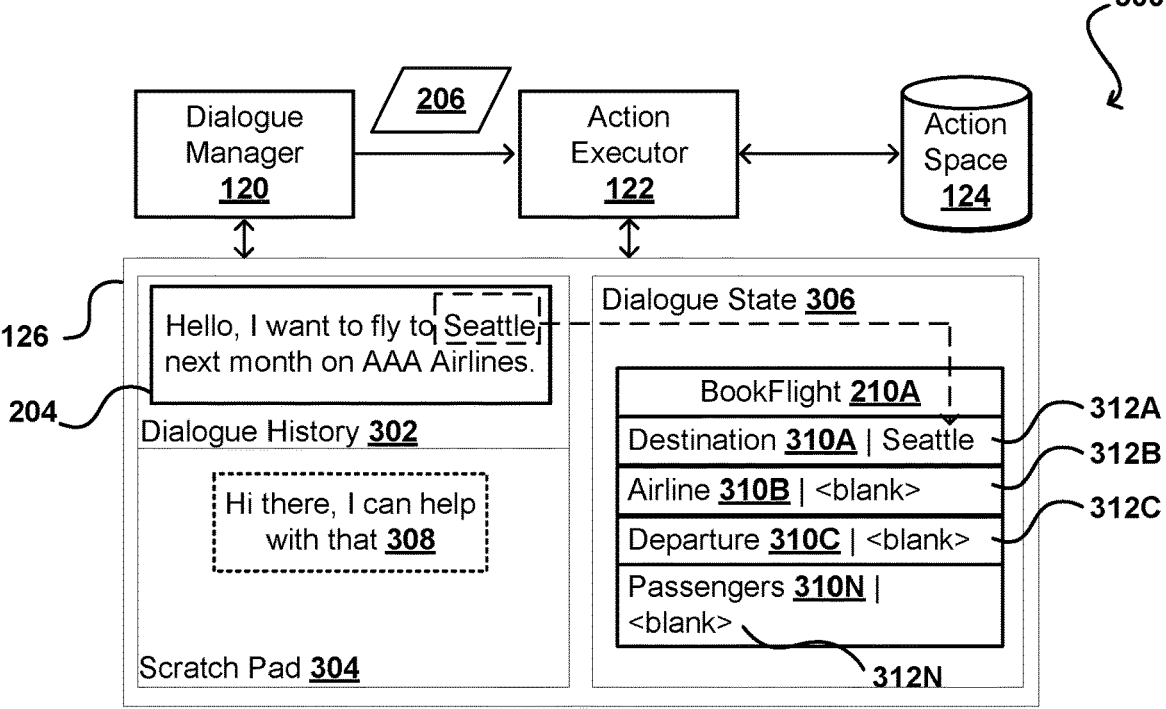

FIG. 3F illustrates the interaction environment, using the framework described herein, begin to iteratively populate the different values 312A-312N. For example, an additional command 206 may be transmitted to the action executor 122 to update or populate one or more values 312A-312N based on information from the dialogue history 302. In at least one embodiment, the command 206 may be directed toward a particular parameter, such as a command to Update (destination) to prompt the action executor 122 to run one or more APIs to identify information within the dialogue history 302, such as within the input 204, that may be used to populate the value 312A. A similar process may be repeated to fill in subsequent parameters for the BookFlight action 210A. For example, with respect to the "Airline" parameter 310B, the dialogue history 302 may be evaluated to extract "AAA Airlines" and to populate the value 312B. However, other parameters may need to be further resolved, as described herein, because the information in the dialogue history 302 does not provide a departure date (e.g., the departure parameter 310C) or the number of passengers (e.g., the passenger parameter 310N).

Figure 3G:
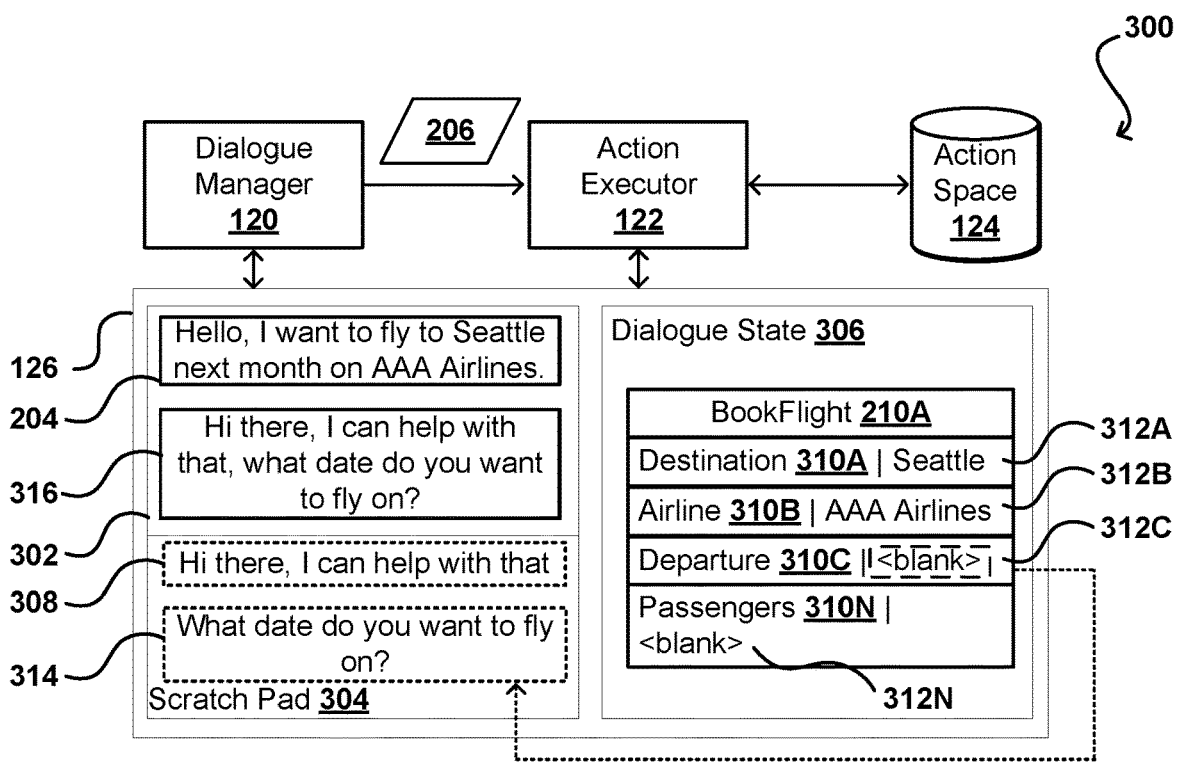

FIG. 3G illustrates identification of the departure date parameter 310C where additional information is not obtainable from the current information provided in the dialogue history 302. Accordingly, various embodiments may cause the dialogue manager 120 to prompt the action executor 122 to execute one or more calls to obtain additional information to determine the value 312C associated with the departure date parameter 310C. For example, an additional question or query may be provided to the user to clarify the missing information, which may be referred to as a contextual clarification. For example, the command 206 may include Clarify( . . . ) with an instruction on which API to use to generate additional queries to the client in order to clarify or otherwise address specific parameters of the BookFlight action 210A. In at least one embodiment, the underlying dialogue system may be used to generate a query back to the user and/or the developer may hard code or otherwise provide a template for asking additional questions to the user. In this example, because additional information is required from the user, the partial response 308 is combined with a parameter question 314 to generate a response 316, which is shown in the dialogue history 302.

Figure 3H:
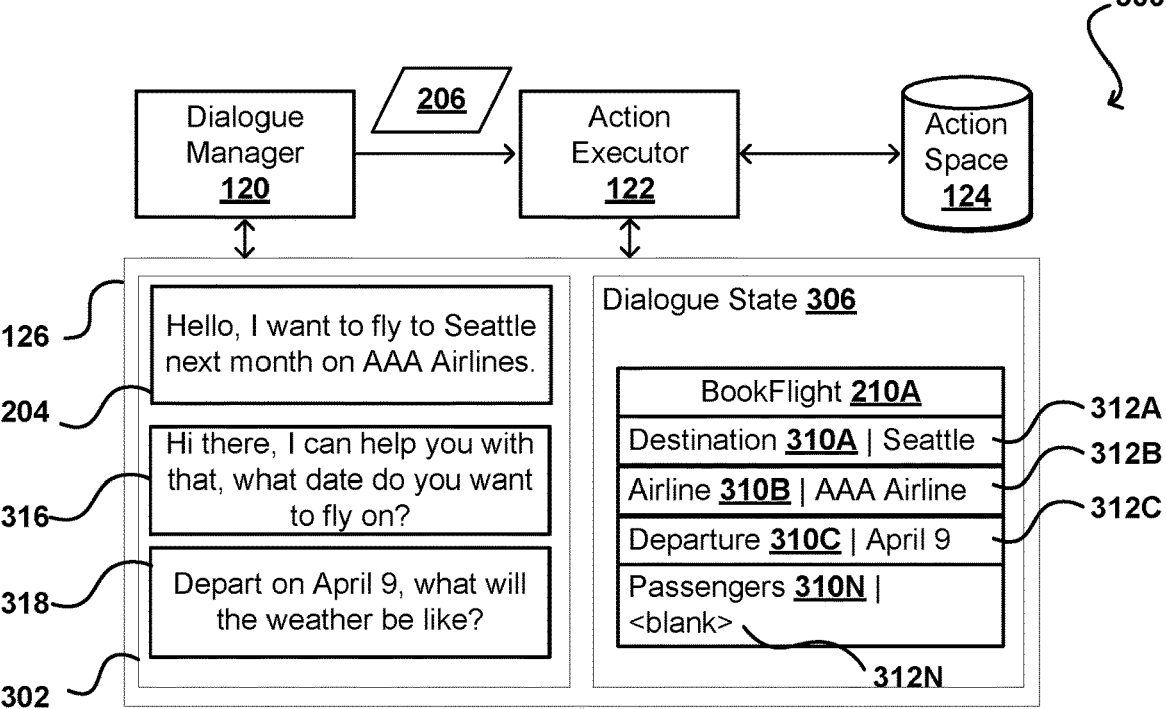

FIG. 3H illustrates the user providing additional information in the form of a reply 318, which in this example is used to both populate the value 312C and also extract additional actions from the reply 318. The reply 318 forms a portion of the dialogue history 302 and may be used to both resolve the missing value 312C and also to identify and retrieve relevant APIs, as needed, based on the context of the reply 318. In this example, the departure date parameter 310C may be identified from the reply 318 and then populated in the dialogue state 306. However, the reply 318 also includes a further query and/or question, and as a result, the command 206 may include the Identify call again to determine whether one or more additional APIs or actions may be relevant for responding to the reply 318.

Figure 3I:
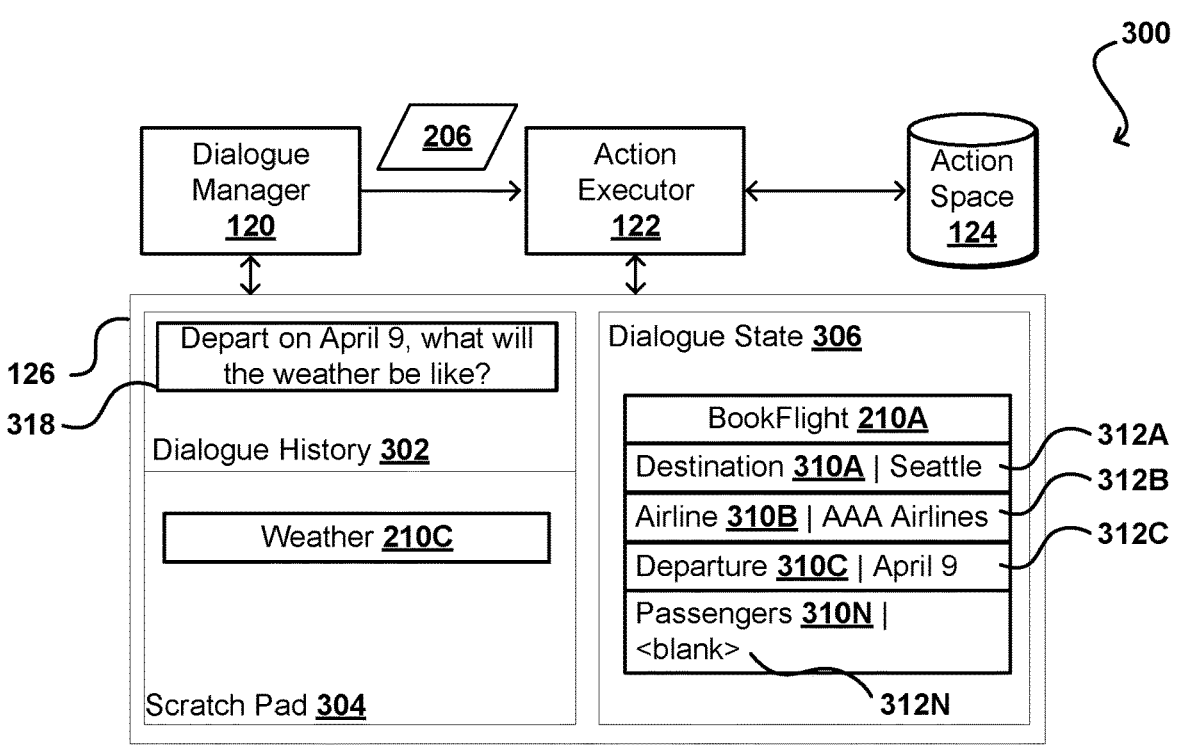

FIG. 3I illustrates an example where the Identify call has recognized that a Weather action 310C could potentially be relevant for addressing the new information provided in the reply 318. Accordingly, the Weather action 210C has been added to the scratch pad 304. In at least one embodiment, the dialogue state 306 (e.g., the action executor 122) may select whether to proceed with filling in the remaining parameters 310N associated with the BookFlight action 210A or may substitute the Weather action 210C and proceed to address the various parameters for the Weather action 210C. The decision to interrupt or otherwise change may be based, at least in part, on developer preferences and/or may be selected based on whether or not information from the dialogue history 302 can be used to quickly fill one or more parameters of the Weather action 210C. For example, if the Weather action 210C only had a single parameter and it would be filled based on the reply 318, it may be advantageous to complete the Weather action 210C first. As another example, if the Weather action 210C were a parameter-less call, executing and completing the Weather action 210C may be preferable.

Figure 3J:
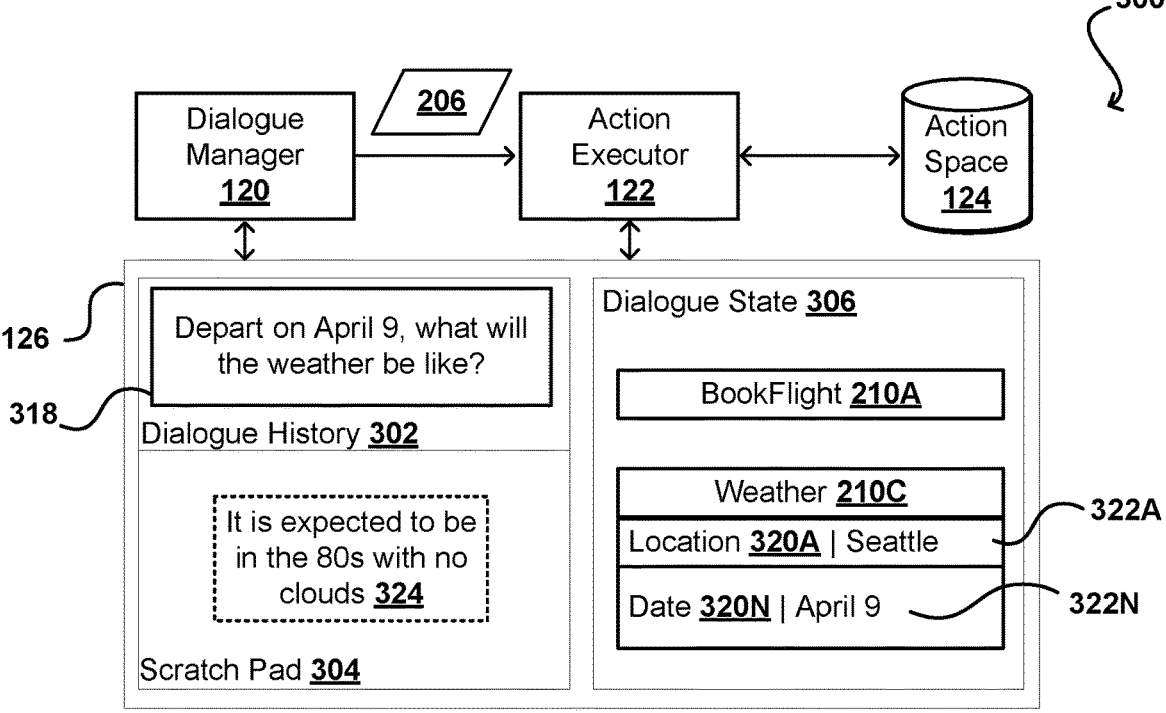
Figure 3K:
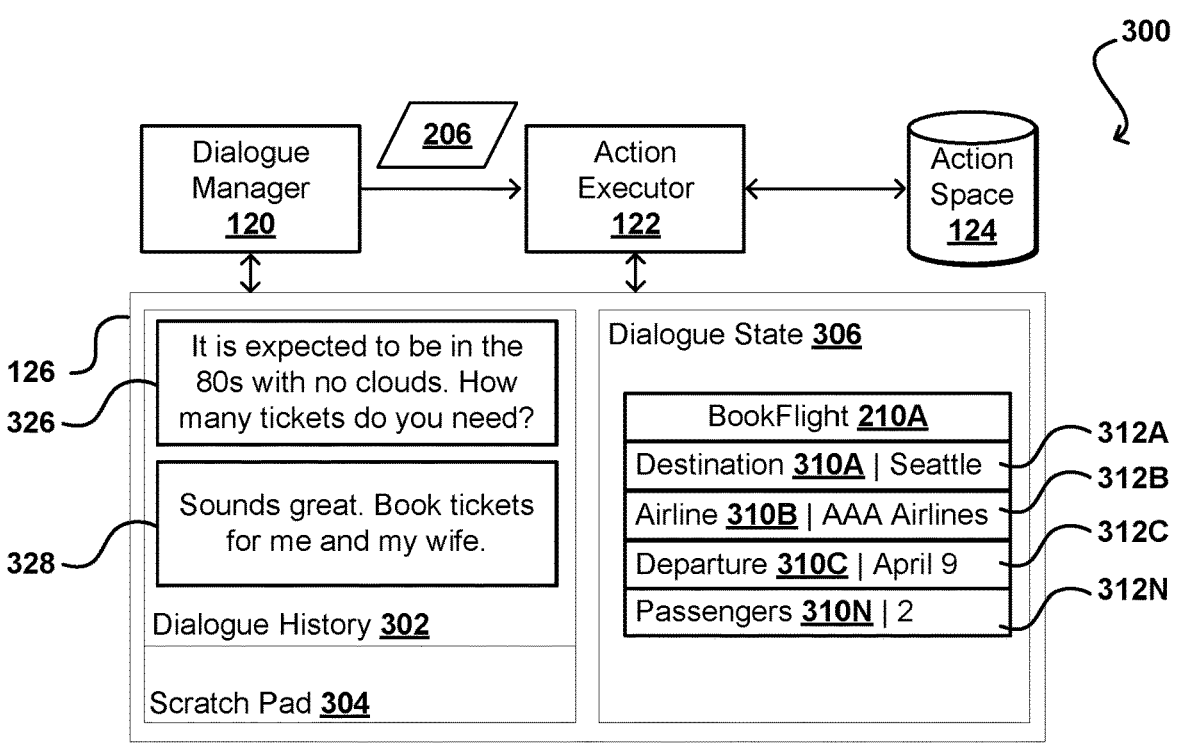

FIG. 3J illustrates an example configuration in which the BookFlight action 210A is halted in favor of the Weather action 210C. In this example, the context of the reply 318 enables the parameter 320A related to location to have an associated value 322A populated with "Seattle" based on information previously presented in the dialogue history 302 and/or using information from the destination parameter 310A associated with the BookFlight action 210A. Furthermore, the dialogue history 302 also provides information associated with a Date parameter 320N, which is populated with "April 9" based on the reply 318. It should be appreciated that various embodiments may also request additional information, such as a full duration of the trip to provide additional information regarding the weather. Because each of the parameters 320A, 320N has been filled (e.g., with the values 322A, 322N) a partial response 324 may be generated in the scratch pad 304. The dialogue manager 120 may then generate additional commands to finish filling in the BookFlight action 210A. As noted herein, because the partial response 324 may represent a completed call, the follow up information needed for the BookFlight action 210A (e.g., a query to obtain information for the parameter 310N) may be appended to the partial response 324 to generate a full response 326, as shown in FIG. 3K.

Figure 3L:
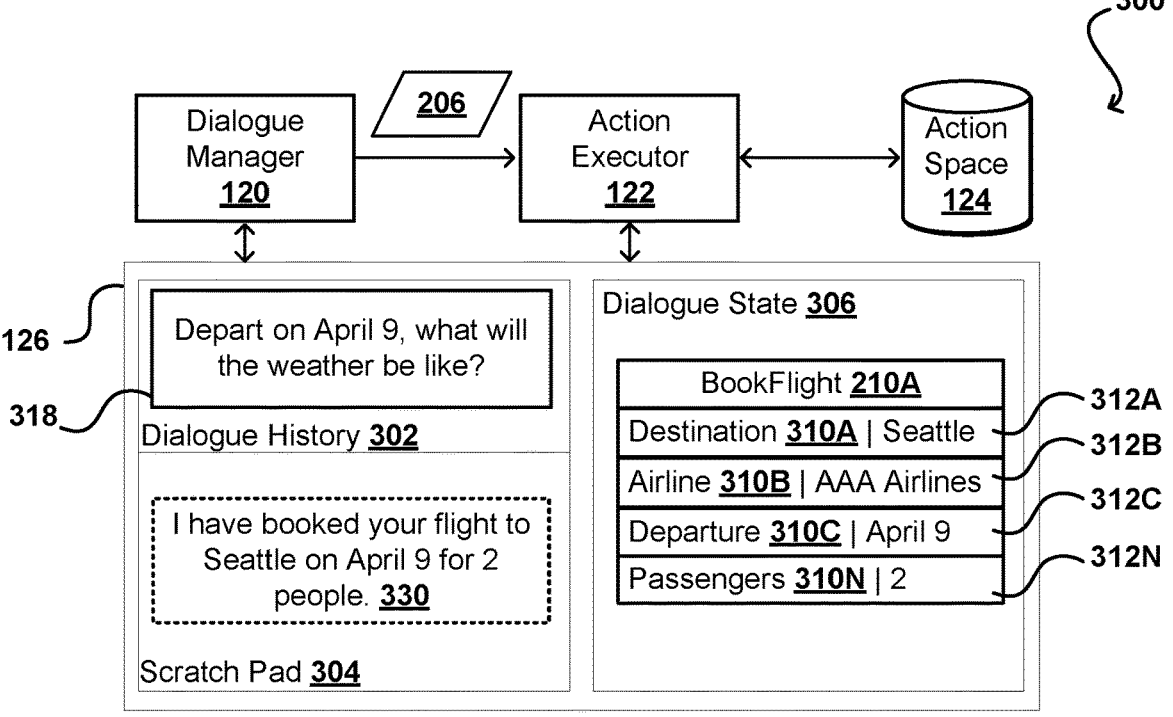

The user may then provide a reply 328 responsive to the full response 326, which may include extraneous comments that do not need a reply and information to continue populating the parameters associated with the BookFlight action 210A. For example, the reply 328 indicates that the user wants to book tickets "for me and my wife." The dialogue manager 120 may then be used to submit further commands 206 to parse and identify relevant information within the reply 328. For example, contextual information may be used to infer that "me and my wife" is equivalent to needing two tickets, which may then be used to populate the passengers parameter 310N. This process may continue until each parameter has been filled for the BookFlight action 210A and/or any additional APIs or actions that are called during the back and forth conversation. As shown in FIG. 3L, an additional partial response 330 may be generated now that the BookFlight action 210A is completed and may then be transmitted back to the user via the dialogue history 302, as noted herein. In this manner, a modular, iterative process is presented in which the dialogue manager 120 may be used to instruct the action executor 122 to implement a developer-determined set of actions to populate various API parameters for a task-specific interaction environment.

Figure 4A:
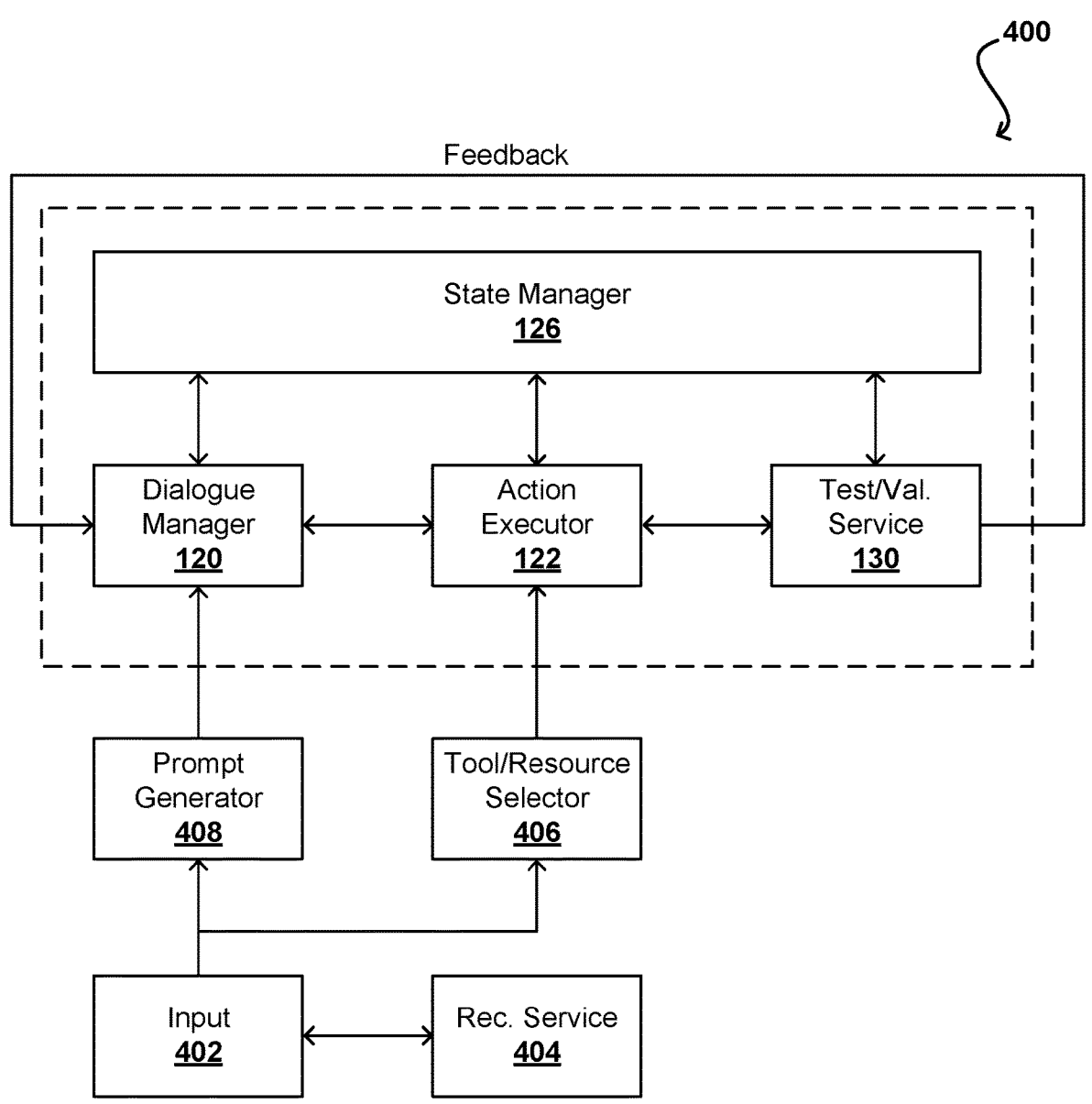
FIG. 4A illustrates an example environment of a builder experience in accordance with various embodiments.

FIG. 4A illustrates an example environment 400 that may be implemented with embodiments of the present disclosure to enable developers to select parameters to control one or more aspects of an underlying dialogue system being implemented with an interaction environment. Various embodiments may refer to the environment 400 as a "builder experience" in which a developer may provide various inputs 402 in order to generate an interaction environment, such as a chatbot or virtual assistant, among various other options. In this example, the input 402 may include information such as descriptions or instructions regarding functionality, desired actions, conversational snippets and/or the like. For example, a description of the desired intent or output of the interaction environment may be provided, such as "a bot to book flights" or "a customer service chatbot to address shipping problems." Furthermore, the input 402 may include specific APIs or templates that are unique to the developer, such as a custom API to receive information to track shipments, as an example. Additionally, different desired capabilities or restrictions to capabilities for an underlying model may also be provided. By way of example, restrictions to responses within a specific domain may be added in order to prevent the underlying model from revealing certain information.

A recommendation service 404 may then use these inputs 402 to provide a recommendation or a preliminary framework for the desired interaction environment. For example, a list of different APIs may be evaluated and then provided responsive to a stated goal or associated domain of the interaction environment. Returning to the flight booking example, the developer may indicate that they want a bot that can book flights and may indicate they want APIs for one way flights. The recommendation service 404 may also automatically recommend round trip flights as well, as those may be more common. Furthermore, the recommendation service 404 may evaluate conversational logs or chat lots provided by the developer in order to determine typical questions and responses to determine whether any APIs or other templates would be useful for the interaction environment.

Various embodiments may also provide a tool/resource selector 406 that may be used to select a number of specific APIs for use with the interaction environment. For example, the developer may wish to use natural language understanding as a skill in order to receive inputs in a variety of different modalities. One or more of the inputs 402 may then be used to select or otherwise specify particular APIs and/or meta-actions (as noted herein) that may be used within the framework. For example, the developer may provide one or more inputs 402 to accept recommendations provided by the recommendation service 404. Additionally, the developer may provide one or more inputs 402 configure the framework based on their desired preferences, which may include more, fewer, and/or different features than those recommended by the recommendation service 404. A prompt generator 408 may then be used to test or otherwise evaluate the interaction environment generated by the developer. For example, the prompt generator 408 may generate a prompt that can be used during in-context learning. It should be appreciated that the developer may also generate the prompt without use of the prompt generator 408, or both may be used in combination in various embodiments. The prompt produced by the prompt generator 408 and/or by the developer may then be used within the framework so that the dialogue manager 120 can evaluate the prompt, predict actions, instruct the action executor 122 to pull available actions for use to populate different variables, and then the testing and validation service 130 may be used to interactively test and provide feedback to improve the interaction environment.

Systems and methods provide a modular approach that define an explicit set of modularized actions that can be individually activated, modified/overridden, and/or debugged. However, various embodiments may also be implemented where the builder experience permits the action space to be implicitly defined by the model which may handle the work of both the dialogue manager 120 and/or the action executor 122. In at least one embodiment, model behavior can be modified in an example-driven way or using post-processing to filter and handle incorrect responses. Each of the modular and common model approach may share similarities, such as similar inputs/outputs and end-to-end training, but the modular approach may provide a more visual, granular approach to tuning and control.

Figures 4B, 4C:
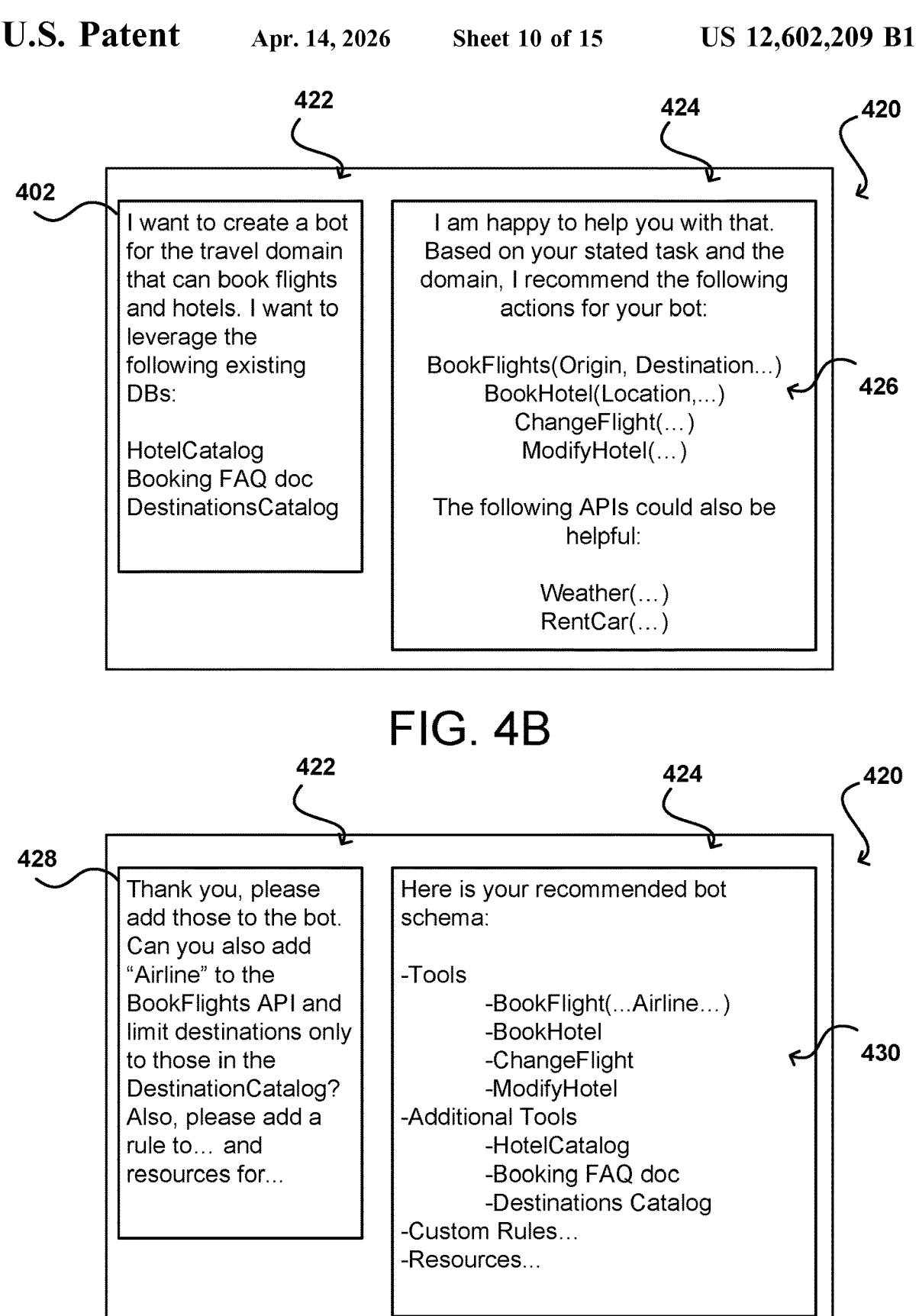
FIGS. 4B and 4C illustrate example representations of a builder environment that can be utilized in accordance with various embodiments.

FIGS. 4B and 4C illustrate an example environment 420 showing a conversational flow within the developer experience in which a developer 422 provides the input 402 and a builder 424 helps the developer 422 build out their desired tool. In this example, the developer 422 provides inputs included the domain for the bot, the desired outcomes, and also links to various databases and/or APIs to be incorporated into the bot. The builder 424 then processes the input 402 to provide a set of recommendations 426 to build out the bot described by the developer 422. For example, the set of recommendations 426 may include various tools or resources that may be implemented by the bot. The tools or resources may also be referred to as a set of skills to specify a collection of actions or abilities that the bot can perform.

In FIG. 4C, the developer 422 approves of the recommendations and then provides further instructions in a follow up input 428. Based on the follow up input, the builder 424 may update or modify different portions of the recommendations 426 and then provides a layout 430 for the developer 422. The developer 422 may then test the interaction environment and make further modifications using the builder 424.

FIG. 5 illustrates an example process 500 for generating a response to a user input to an interaction environment. It should be understood that there can be additional, fewer, or alternative steps performed in similar or alternative orders, or in parallel, within the scope of the various embodiments unless otherwise specifically stated. In this example, an input is received at an interaction environment 502. The input may include a textual or auditory input (or various other types of inputs) associated with a user trying to achieve a goal or task within a task-oriented interaction environment, as one example, that may include a chatbot or the like. The input may be decomposed into one or more subcomponents 504. For example, the input may be evaluated to determine what types of actions are to be executed in order to provide a response or accomplish a task associated with the input. The input may include multiple different components, for example, that may each have one or more discrete actions that may be used to generate a response to the input, as noted herein.

Various embodiments may select, from a set of defined actions, one or more actions associated with the one or more sub-components 506. In certain embodiments, a first sub-component may be selected and associated actions for that sub-component may be determined and then executed, according to systems and methods, prior to performing the process on a second sub-component. However, it should be appreciated that tasks may also be performed in parallel or partially in parallel, such as performing parts of the actions for a first sub-component while identifying and preparing actions for a second sub-component. An action may be selected for a selected sub-component 508 and then the input may be evaluated to determine whether one or more values corresponding to one or more parameters of the action are present within the input 510. In other words, the input may be evaluated to determine whether the action can be executed using the information provided in the input. In certain embodiments, an action may be parameter-less, and as a result, the input may be sufficient to execute the action without needing to extract any parameters.

In at least one embodiment, it may be determined whether there are additional parameters present for the selected action 512. If so, then it may further be determined whether the input provides sufficient information to fill the parameters 514. If so, then the parameter values may be extracted from the input. If not, then a prompt may be generated to receive additional information corresponding to the one or more parameters 516. This process may be repeated for a given action until all parameters have been filled. However, in certain embodiments, additional parameters for other actions may also be evaluated prior to filling all of the parameters of a first action.

Returning to the parameter determination 512, if there are no more parameters for a given action then it may be determined whether there are additional actions to perform 518. If there are, then an action may be selected, and its parameters may be evaluated and filled. If not, then a response may be generated for the input based on the execution of the actions 520. Accordingly, embodiments of the present disclosure may be used to evaluate an input to determine appropriate actions to address the input and then iteratively fill parameters for those actions until the actions are executed to satisfy the request associated with the input.

FIG. 6 illustrates an example process 600 for generating an interaction environment associated with a builder experience. In this example, a builder environment is provided to generate an interaction environment 602. A developer may interact with the builder environment, such as inputting prompts, that are received within the builder environment 604. The prompts may be associated with input information for a desired interaction environment, such as one or more conditions for the interaction environment, one or more actions or tools to use, and/or the like. The input may be evaluated to determine one or more properties for the interaction environment 606 and a set of recommended actions may be provided 608. The developer may evaluate the recommended actions and provide one or more restrictions that are received at the builder environment 610. The restrictions may include additional parameters added to certain actions, specific actions or APIs that are permitted for use, and/or the like. The recommended set of actions may be modified based on the one or more restrictions 612 and then the interaction environment may be provided for execution and testing 614.

Figure 7:
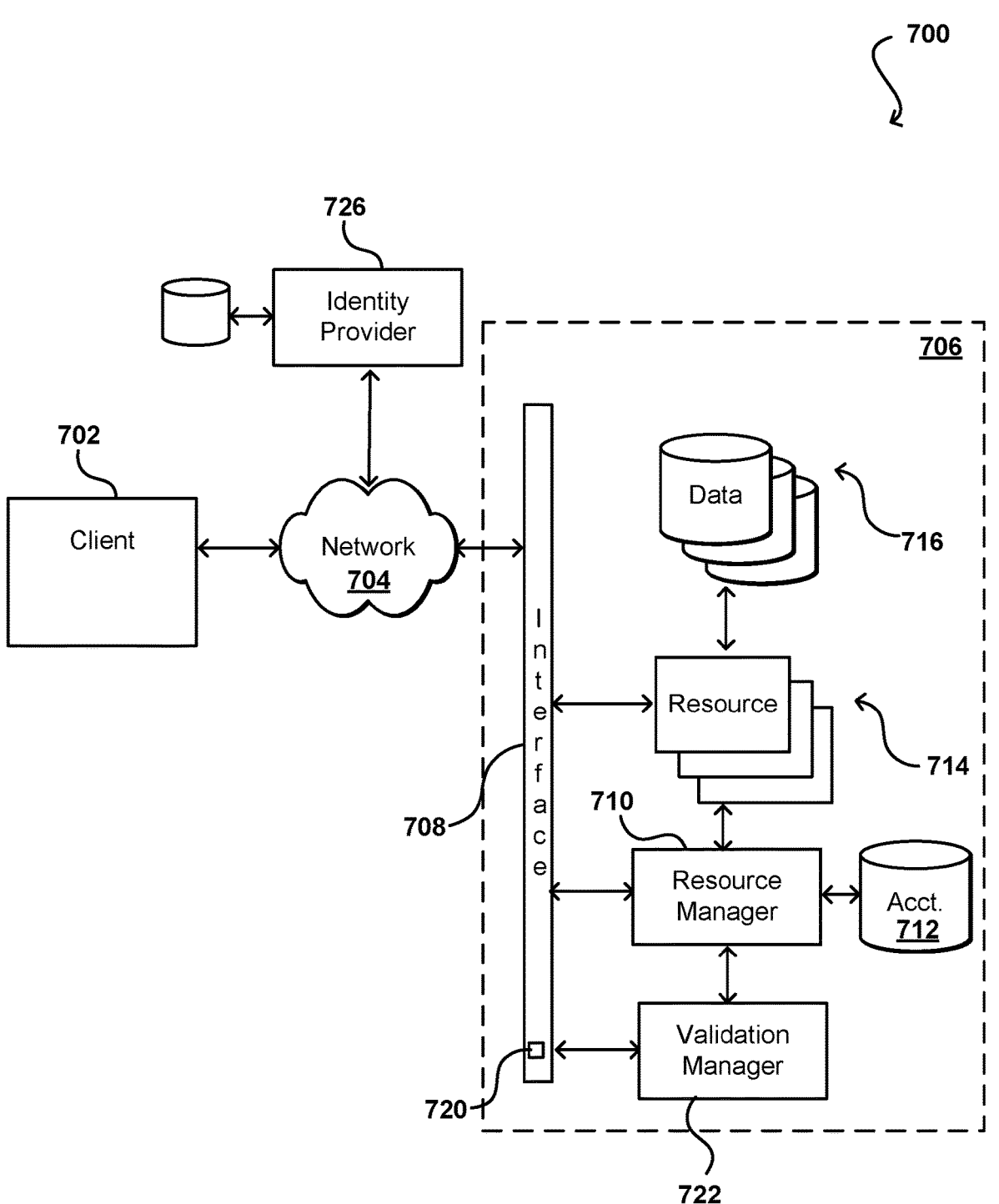
FIG. 7 illustrates an example environment in which aspects of various embodiments can be implemented.

FIG. 7 illustrates components of an example cloud computing environment 700 in which aspects of various embodiments can be implemented. In at least some embodiments, a client device 702 wanting to utilize a portion of the resources 714 can submit a request over a network 704 that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. These credentials can be provided by, or obtained from, a number of different entities, such as an identity provider 726, a key management service, a corporate entity, a certificate authority, an identify broker, and the like. In some embodiments, a user can provide information useful in obtaining the credentials, such as user identity, account information, password, user-specific cryptographic key, customer number, and the like. The identity provider can provide the credentials to the resource provider environment 706 and/or to the client device 702, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors.

The resource provider can validate this information against information stored for the user, for example using a validation manager 722. If the user has an account with the appropriate permissions, status, etc., the resource manager 710 can determine whether there are adequate resources 714 available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. Additionally, the user may be granted access to data 716 associated with the user account. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager 710 can utilize dedicated APIs 720 in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service.

Figure 8:
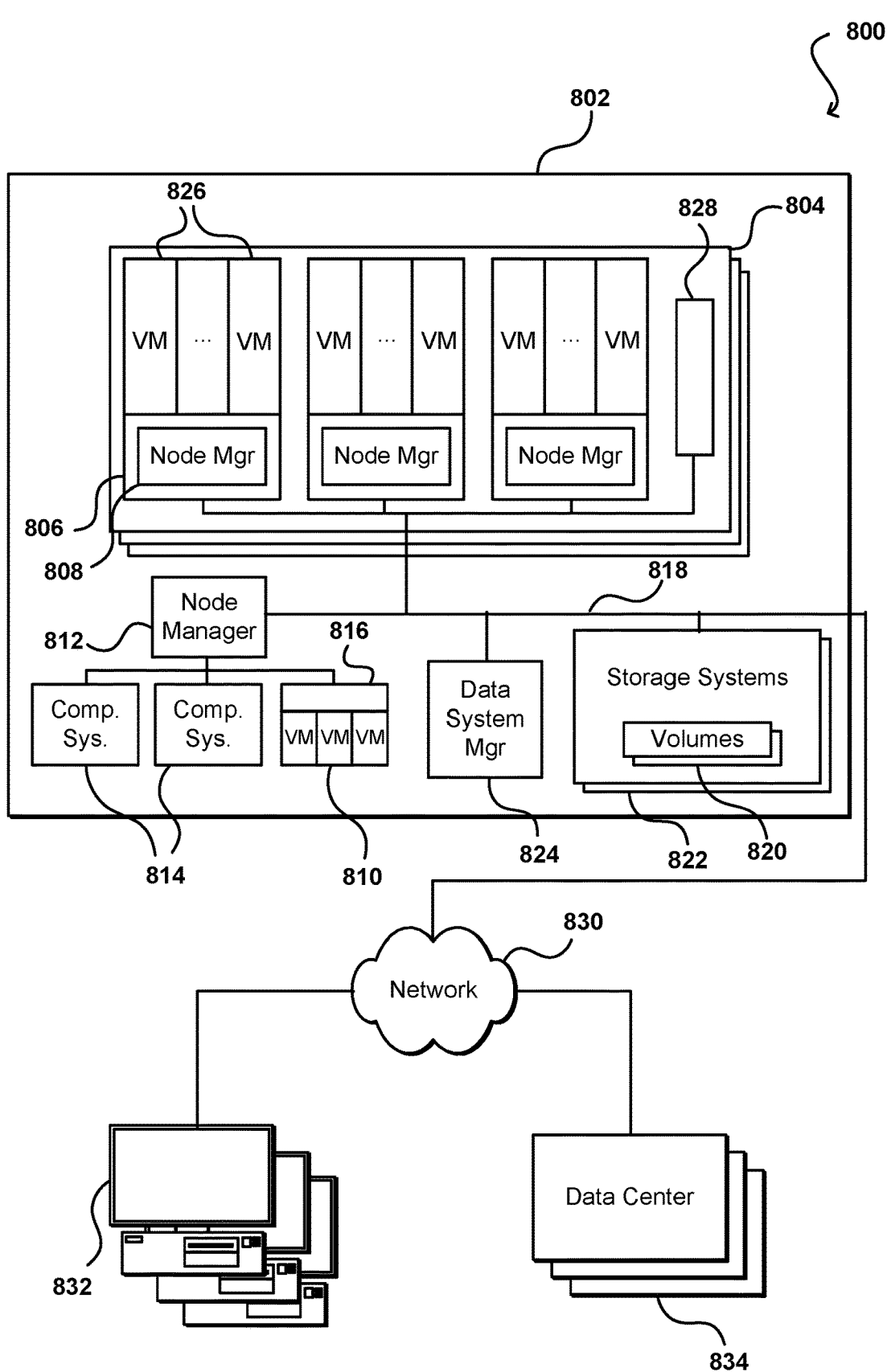
FIG. 8 illustrates components of an example data center that can be utilized in accordance with various embodiments.

FIG. 8 illustrates an example network configuration 800 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services.

Multiple remote archival storage systems external to the data center may also be used to store additional copies of at least some portions of at least some block-based data storage volumes.

In this example, a data center 802 includes a number of racks 804, each rack including a number of host computing systems 806, as well as an optional rack support computing system 828 in this example embodiment. The host computing systems 806 on the illustrated rack 804 each host one or more virtual machines 826 in this example, as well as a distinct node manager module 812 associated with the virtual machines on that host computing system to manage those virtual machines. One or more other host computing systems 816 may also each host one or more virtual machines 810 in this example. Each virtual machine 810 may act as an independent resource node for executing one or more program copies or performing another such action or process for user data requests, I/O operations, etc. In addition, this example data center 802 further includes additional host computing systems 814 that do not include distinct virtual machines, but may nonetheless each act as a resource node for one or more tasks being executed for a user. In this example, a node manager module 812 executing on a computing system (not shown) distinct from the host computing systems 814 and 816 is associated with those host computing systems to manage the resource nodes provided by those host computing systems, such as in a manner similar to the node manager modules 808 for the host computing systems 806. The rack support computing system 828 may provide various utility services for other computing systems local to its rack 804 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 802 also includes a computing system 824 that executes a data storage system manager module for the block-based data storage service to assist in managing the availability of non-local block-based data storage to programs executing on resource nodes provided by the host computing systems located within the data center (or optionally on computing systems located in one or more other data centers 834, or other remote computing systems 832 external to the data center). In particular, in this example the data center 802 includes a pool of multiple block-based data storage systems 822, which each have local block-based storage for use in storing one or more volume copies 820. Access to the volume copies 820 is provided over the internal network(s) 818 to programs executing on various resource nodes 810 and 814. As discussed in greater detail elsewhere, a block-based data storage system manager module 824 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the system manager module 824 may coordinate with the node manager modules 812, 808 to manage use of volumes by programs executing on associated resource nodes, while in other embodiments the node manager modules may not be used to manage such volume use. In addition, in other embodiments, one or more system manager modules 824 may be structured in other manners, such as to have multiple instances of the system manager executing in a single data center (e.g., to share the management of non-local block data storage by programs executing on the resource nodes provided by the host computing systems located within the data center), and/or such as to have at least some of the functionality of a system manager module being provided in a distributed manner by software executing on some or all of the server block data storage systems 822 (e.g., in a peer-to-peer manner, without any separate centralized system manager module on a computing system 824).

In this example, the various host computing systems, server block data storage systems, and computing systems are interconnected via one or more internal networks 818 of the data center, which may include various networking devices (e.g., routers, switches, gateways, etc.) that are not shown. In addition, the internal networks 818 are connected to an external network 830 (e.g., the Internet or another public data network) in this example, and the data center 802 may further include one or more optional devices (not shown) at the interconnect between the data center and an external network (e.g., network proxies, load balancers, network address translation devices, etc.). In this example, the data center 802 is connected via the external network 830 to one or more other data centers 834 that each may include some or all of the computing systems and storage systems illustrated with respect to data center 802, as well as other remote computing systems 832 external to the data center. The other computing systems 832 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server data storage systems may further be interconnected with one or more other networks or other connection mediums, such as a high-bandwidth connection over which the storage systems may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 8 has been simplified for the purposes of explanation, and that the number and organization of host computing systems, server block data storage systems and other devices may be much larger than what is depicted in FIG. 8. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, a data center may execute tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 8 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 8, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage).

Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a system manager module, can call into the data plane to allocate the desired amount of storage from the available resources, and can provide the customer with an identifier for the data volume. In some embodiments, the customer then can call an "Attach Volume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "Detach Volume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

FIG. 9 illustrates a logical arrangement of a set of general components of an example computing device 900. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one input element 908 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 900 of FIG. 9 can include one or more network interface or communication elements or components 910 for communicating over various networks, such as a Wi-Fi, Bluetooth, RF, wired, or wireless communication systems. The device in many embodiments can communicate with a network, such as the Internet, and may be able to communicate with other such devices. The device will also include one or more power components 912, such as power cords, power ports, batteries, wirelessly powered or rechargeable receivers, and the like.

Example environments discussed herein for implementing aspects in accordance with various embodiments are primarily Web-based, as relate to Web services and cloud computing environments, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, executed by one or more processors of a computing system comprising a dialogue management framework, the method comprising:

receiving, by a dialogue manager, an input to an interaction environment;

determining one or more sub-components of the input associated with independent actions for resolution;

determining, by a state manager, one or more actions from a set of actions, the one or more actions associated with the one or more sub-components of the input;

selecting an action for a selected sub-component of the one or more sub-components;

determining, from the input, one or more values corresponding to one or more parameters of the action;

determining, one or more additional values corresponding to one or more additional parameters remain unresolved;

generating, by an interaction service, a response to the input associated with the one or more additional values;

receiving, by the dialogue manager, a reply to the response;

determining, from the reply, the one or more additional values;

determining each value of the one or more parameters of the action is resolved; and executing, by an action executor of the dialogue management framework, the action using the one or more parameters.

2. The computer-implemented method of claim 1, further comprising:

generating a first partial response using the action;

selecting a second action for the selected sub-component;

executing the second action to generate a second partial response; and generating a full response combining the first partial response and the second partial response.

3. The computer-implemented method of claim 1, further comprising:

determining, from the reply, a revised sub-component associated with a second action;

halting execution of the action;

determining one or more second action values for one or more section action parameters; and executing the second action.

4. The computer-implemented method of claim 1, further comprising:

providing a builder environment to create the interaction environment;

receiving a developer input including a domain and the set of actions; and generating the interaction environment using the set of actions.

5. The computer-implemented method of claim 1, wherein the set of actions are developer-defined actions to restrict one or more outputs of an underlying generative language model.

6. A computer-implemented method, executed by one or more processors of a computing system comprising a dialogue management framework, the method comprising:

determining, by a dialogue manager, a first portion and a second portion of an input;

predicting, by a state manager, a first relevant action for the first portion, the first relevant action being included within a set of actions;

selecting a meta-action, from a pre-defined set of meta-actions, based at least on the first relevant action;

causing, by an action executor, the meta-action to execute using one or more parameters of the first relevant action;

determining at least some first relevant action values for a set of first action parameters are unresolvable from the input; and generating, by an interaction service, a responsive query directed toward the at least some first relevant action values.

7. The computer-implemented method of claim 6, further comprising:

determining, from a second input, a set of unresolved first relevant action values; and executing the first relevant action.

8. The computer-implemented method of claim 7, further comprising:

predicting a second relevant action for the second portion, the second relevant action being included within the set of actions;

selecting a second meta-action, from the pre-defined set of meta-action, based at least on the second relevant action;

determining, from at least one of the input and the second input, a set of unresolved second relevant action values;

executing the second relevant action; and generating a response to the input based, at least, on respective outputs of the execution of the first relevant action and the second relevant action.

9. The computer-implemented method of claim 6, wherein at least some actions of the set of actions are developer-defined to constraint an underlying generative language model.

10. The computer-implemented method of claim 6, further comprising:

determining an initial first relevant action value from the input;

adding the initial first relevant action value to an initial first relevant action parameter;

determining a next first relevant action value is unresolved by the input;

generating a request for information associated with the next first relevant action value;

determining the next first relevant action value after receiving an answer to the request;

adding the next first relevant action value to a next first relevant action parameter; and determining a following first relevant action value from the input after adding the next first relevant action value.

11. The computer-implemented method of claim 6, further comprising:

predicting a second relevant action for the second portion, the second relevant action being included within the set of actions;

resolving a portion of the one or more parameters of the first relevant action;

resolving a portion of second relevant action parameters; and resolving remaining first relevant action parameters after resolving the portion of the second relevant action parameters.

12. The computer-implemented method of claim 6, wherein the input is at least one of an auditory input or a textual input.

13. The computer-implemented method of claim 6, wherein the input is received within an interaction environment, the interaction environment comprising a task-oriented interaction environment within a defined domain.

14. The computer-implemented method of claim 6, further comprising:

provide a builder environment to create an interaction environment;

receive a developer input including a domain and the set of actions; and generate the interaction environment using the set of actions.

15. A system, comprising:

at least one processor; and memory including instructions that, when executed by the at least one processor, cause the system to:

determine a first portion and a second portion of an input;

predict a first relevant action for the first portion, the first relevant action being included within a set of actions;

select a meta-action, from a pre-defined set of meta-actions, based at least on the first relevant action;

execute an action executor to cause the meta-action to execute using one or more parameters of the first relevant action;

determine at least some first relevant action values for a set of first action parameters are unresolvable from the input; and generate a responsive query directed toward the at least some first relevant action values.

16. The system of claim 15, wherein the instructions when executed further cause the system to:

determine, from a second input, a set of unresolved first relevant action values; and execute the first relevant action.

17. The system of claim 16, wherein the instructions when executed further cause the system to:

predict a second relevant action for the second portion, the second relevant action being included within the set of actions;

select a second meta-action, from the pre-defined set of meta-actions, based at least on the second relevant action;

determine, from at least one of the input and the second input, a set of unresolved second relevant action values;

execute the second relevant action; and generate a response to the input based, at least, on respective outputs of the execution of the first relevant action and the second relevant action.

18. The system of claim 15, wherein at least some actions of the set of actions are developer-defined to constraint an underlying generative language model.

19. The system of claim 15, wherein the instructions when executed further cause the system to:

determine an initial first relevant action value from the input;

add the initial first relevant action value to an initial first relevant action parameter;

determine a next first relevant action value is unresolved by the input;

generate a request for information associated with the next first relevant action value;

determine the next first relevant action value after receiving an answer to the request;

add the next first relevant action value to a next first relevant action parameter; and determine at least one following first relevant action value from the input after adding the next first relevant action value.

20. The system of claim 15, wherein the instructions when executed further cause the system to:

predict a second relevant action for the second portion, the second relevant action being included within the set of actions;

resolve a portion of the one or more parameters of the first relevant action;

resolve a portion of the second relevant action by using one or more parameters associated with the second relevant action; and resolve remaining first relevant action parameters after resolving the portion of the one or more parameters associated with the second relevant action.

* * * * *